United States Patent
Kolekar et al.

(10) Patent No.: US 11,617,077 B2
(45) Date of Patent: Mar. 28, 2023

(54) SECURE USER EQUIPMENT CAPABILITY TRANSFER FOR USER EQUIPMENT WITH NO ACCESS STRATUM SECURITY

(71) Applicant: Intel Corporation, Santa Clara, CA (US)

(72) Inventors: Abhijeet Kolekar, Hillsboro, OR (US); Bharat Shrestha, San Diego, CA (US); Sudeep Palat, Cheltenham (GB)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 17/064,530

(22) Filed: Oct. 6, 2020

(65) Prior Publication Data

US 2021/0021994 A1      Jan. 21, 2021

Related U.S. Application Data

(60) Provisional application No. 62/911,960, filed on Oct. 7, 2019.

(51) Int. Cl.
| | |
|---|---|
| *H04L 29/06* | (2006.01) |
| *H04W 12/041* | (2021.01) |
| *G16Y 30/10* | (2020.01) |
| *H04W 8/24* | (2009.01) |
| *H04L 9/32* | (2006.01) |
| *H04W 12/037* | (2021.01) |
| *H04W 12/106* | (2021.01) |

(52) U.S. Cl.
CPC ............ *H04W 12/041* (2021.01); *G16Y 30/10* (2020.01); *H04L 9/3242* (2013.01); *H04W 8/24* (2013.01); *H04W 12/037* (2021.01); *H04W 12/106* (2021.01); *H04L 2209/80* (2013.01)

(58) Field of Classification Search
CPC ............ H04W 12/041; H04W 12/106; H04W 12/037; H04W 8/24; H04L 9/3242; H04L 2209/80
See application file for complete search history.

(56) References Cited

U.S. PATENT DOCUMENTS

| | | | |
|---|---|---|---|
| 2002/0066011 A1 * | 5/2002 | Vialen | H04W 12/02 380/247 |
| 2021/0168594 A1 * | 6/2021 | Wu | H04W 12/033 |
| 2022/0007182 A1 * | 1/2022 | Stojanovski | H04W 12/041 |
| 2022/0225460 A1 * | 7/2022 | Shrestha | H04W 76/30 |

FOREIGN PATENT DOCUMENTS

| | | | | |
|---|---|---|---|---|
| WO | WO-2017117721 A1 * | 7/2017 | | H04L 63/1458 |
| WO | WO-2020092542 A1 * | 5/2020 | | H04L 9/30 |
| WO | WO-2021051974 A1 * | 3/2021 | | H04L 9/3242 |

OTHER PUBLICATIONS

Orhanou, Ghizlane, et al. "EPS confidentiality and integrity mechanisms algorithmic approach." arXiv preprint arXiv:1102.5191 (2011). (Year: 2011).*

* cited by examiner

*Primary Examiner* — Shawnchoy Rahman
(74) *Attorney, Agent, or Firm* — Schwabe, Williamson & Wyatt, P.C.

(57) ABSTRACT

Disclosed embodiments are related to Management Data Analytics (MDA) relation with Self-Organizing Network (SON) functions and coverage issues analysis use case. Other embodiments may be described and/or claimed.

20 Claims, 13 Drawing Sheets

SECURE USER EQUIPMENT CAPABILITY TRANSFER FOR USER EQUIPMENT WITH NO ACCESS STRATUM SECURITY

CROSS REFERENCE TO RELATED APPLICATION

The present application claims priority to U.S. Provisional App. No. 62/911,960 filed Oct. 7, 2019, the contents of which are hereby incorporated by reference in their entirety.

FIELD

Embodiments relate generally to the technical field of wireless communications, communication networks, and information security (InfoSec), and in particular to preventing man-in-the-middle attacks during network attachment and/or network re-establishment procedures.

BACKGROUND

There is a vulnerability in current Third Generation Partnership Project (3GPP) Radio Resource Control (RRC) specifications for the user equipment (UE) capability enquiry procedure (see e.g., Shaik et al., "NEW VULNERABILITIES IN 4G AND 5G CELLULAR ACCESS NETWORK PROTOCOLS: EXPOSING DEVICE CAPABILITIES," WiSec '19: Proceedings of the 12th Conference on Security and Privacy in Wireless and Mobile Networks, pgs. 221-231 (May 2019), available at: https://doi.org/10.1145/3317549.3319728 ("[1]"). This exposes the UE capabilities to tampering by a man-in-the-middle (MITM) attacker on the radio interface, which can result in degradation of service, e.g., downgrading the UE's maximum throughput. Tampering of UE capabilities by a man-in-the-middle (MITM) attacker on the radio surface is possible because the 3GPP Release 15 specification, 3GPP TS 33.501 v15.6.0 (Sep. 25, 2019) ("[TS33501]") allows a UE capability enquiry procedure to occur before RRC security establishment. MITM attack can cause a denial of service attack (see e.g., [1]). Since the UE capabilities are persistently stored in the network, the impact of the attack can last for weeks, or until the UE is power cycled. Such attacks can have a particularly high impact on unattended IoT devices.

To address these issues, a security protection of the RRC UE capability transfer procedure has been specified in [TS33501]. The fundamental requirement of the protection is that UE supports Access Stratum (AS) security. However, there is a type of Cellular Internet of Things (CIoT) devices that only support control-plane optimization. Such devices do not support AS security for UE capability transfer.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
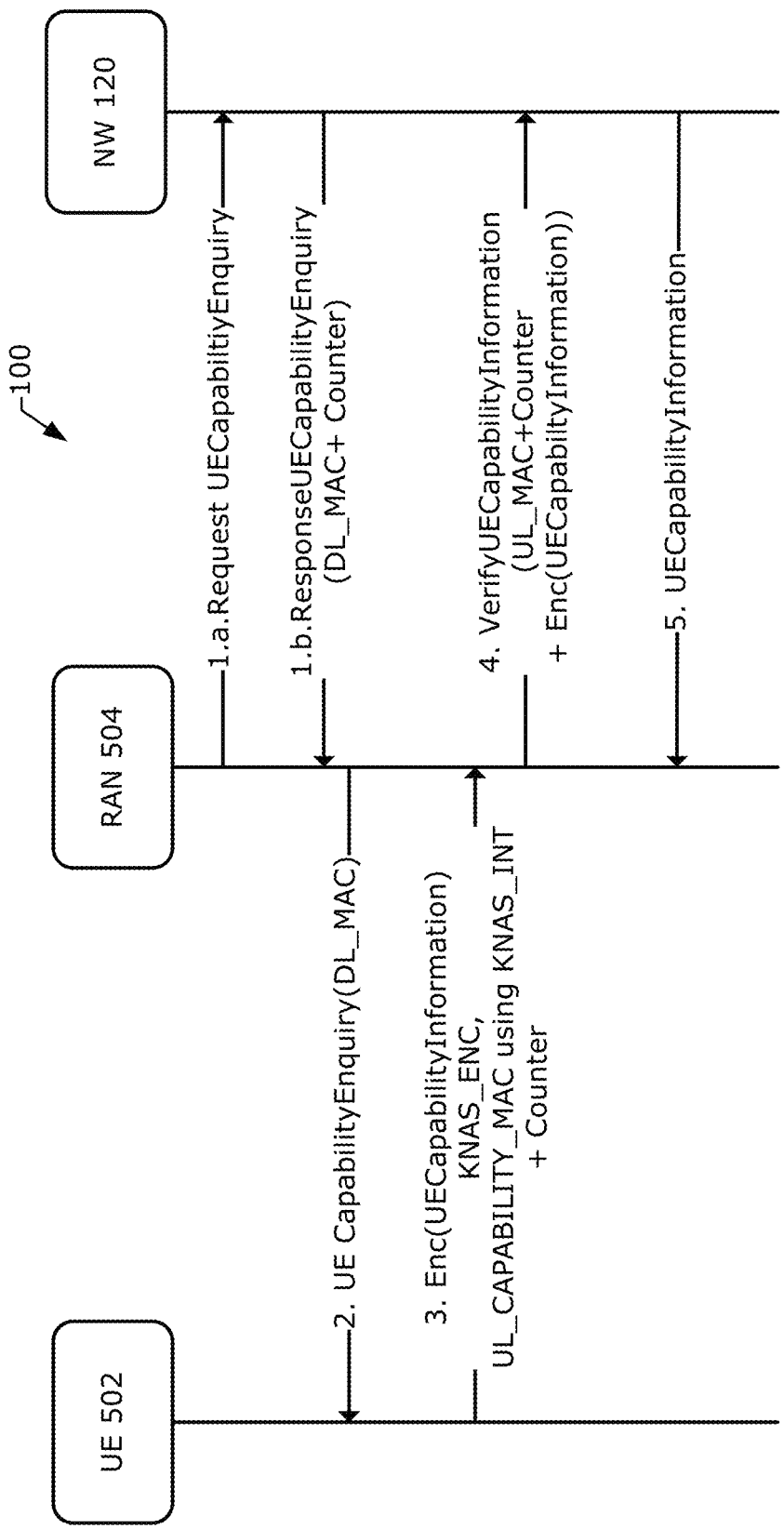
FIG. 1 illustrates an example user equipment (UE) Capability Transfer procedure for Use with no Access Stratum (AS) Security, according to various embodiments.

There is a vulnerability in current Third Generation Partnership Project (3GPP) Radio Resource Control (RRC) specifications for the user equipment (UE) capability enquiry procedure (see e.g., [1]). This exposes the UE capabilities to tampering by a man-in-the-middle (MITM) attacker on the radio interface, which can result in degradation of service, e.g., downgrading the UE's maximum throughput. Tampering of UE capabilities by a man-in-the-middle (MITM) attacker on the radio surface is possible because the 3GPP Release 15 specification, 3GPP TS 33.501 v15.6.0 (Sep. 25, 2019) ("[TS33501]") allows a UE capability enquiry procedure to occur before RRC security establishment. MITM attack can cause a denial of service attack (see e.g., [1]). Since the UE capabilities are persistently stored in the network, the impact of the attack can last for weeks, or until the UE is power cycled. Such attacks can have a particularly high impact on unattended IoT devices.

The researchers in [1] demonstrated the feasibility of the attack using low-cost equipment and describe related vulnerabilities in 3GPP specifications for the capability transfer procedures. The device identification is based on the differential analysis of the capabilities that are obtained from a UE. With the reference model, baseband vendors, operating system (OS) developers or device manufacturers are all possibly detected. The attackers may determine potential vulnerabilities applicable to the identified device, which has potential security threats.

A secondary goal of this attack is to determine potential vulnerabilities applicable to the identified device. In particular, Mobile Network Mapping (MNmap) can be supplemented with vulnerability information from the external sources (e.g., vulnerability databases from baseband vendors and device manufacturers) and perform targeted attacks. Further, these device fingerprints can be combined with the permanent identifier international mobile subscriber identity (MIST) to track subscribers. While 5G prohibited the plaintext transmission of IMSI in any situation (see e.g., [TS33501] and 3GPP TS 23.501 v16.2.0 (Sep. 24, 2019) ("[TS23501]")), fingerprinting of a device and user is still possible when the device-type information is unique among the nearby devices.

To address these issues, a security protection of the RRC UE capability transfer procedure has been specified in [TS33501]. The fundamental requirement of the protection is that UE supports Access Stratum (AS) security. However, there is a type of Cellular Internet of Things (CIoT) devices that only support control-plane optimization. Such devices do not support AS security for UE capability transfer. For those devices, a security solution that enables the network to verify the UE radio capabilities provided by the UE should be developed. The present disclosure provides Non-Access Stratum (NAS) and RRC based solutions to send UE capability.

1. Security Aspects of the Cellulat Internet of Things Features in 5G Systems The architectural study in 3GPP TR 23.724 v16.1.0 (Jun. 11, 2019) ("[TR23724]") addresses two new Fifth Generation (5G) features related to service delivery for CIoT capable UEs (e.g., UE 502 in FIG. 5). The first feature is for the infrequent transmission of small data. It is targeted at constrained, low power and low rate UEs 502. The solution for this feature makes use of the Non-Access Stratum (NAS) signalling to transport the data similarly to the Data over NAS (DoNAS) feature in the Evolved Packet System (EPS). The second feature is for the frequent transmission of small data and is targeted at more active UEs. It is expected that the final solution for this feature will be based on a mixture of an enhanced version of RRC inactive with early data and the EPS resume suspend feature for Narrow Band IoT (NB-IoT). Since both features are based on the EPS ones, it is natural to expect similar security impact on the 5G System (5GS) to support them.

Figure 5:
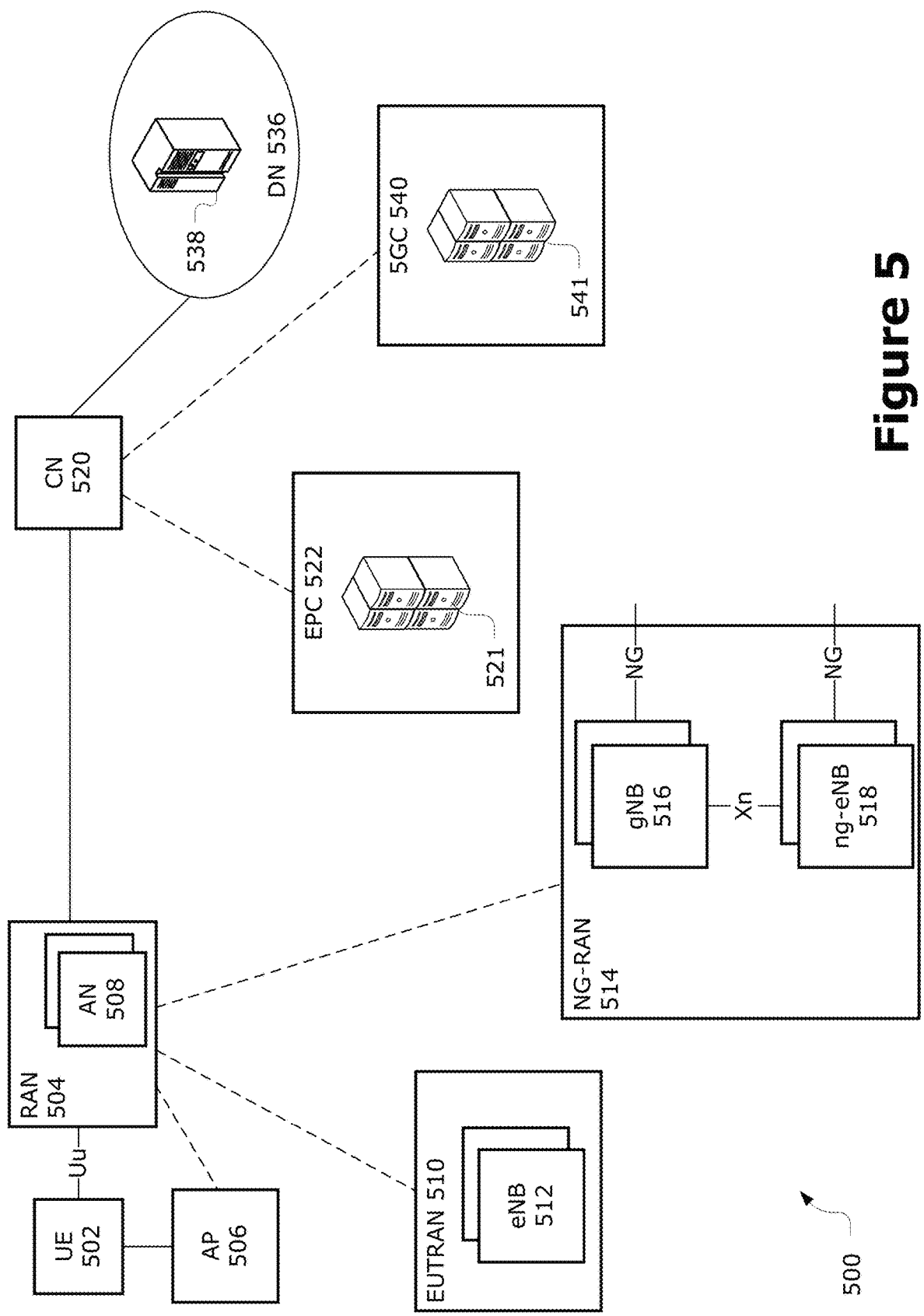
FIG. 5 illustrates an example network architecture according to various embodiments.
Figure 6:
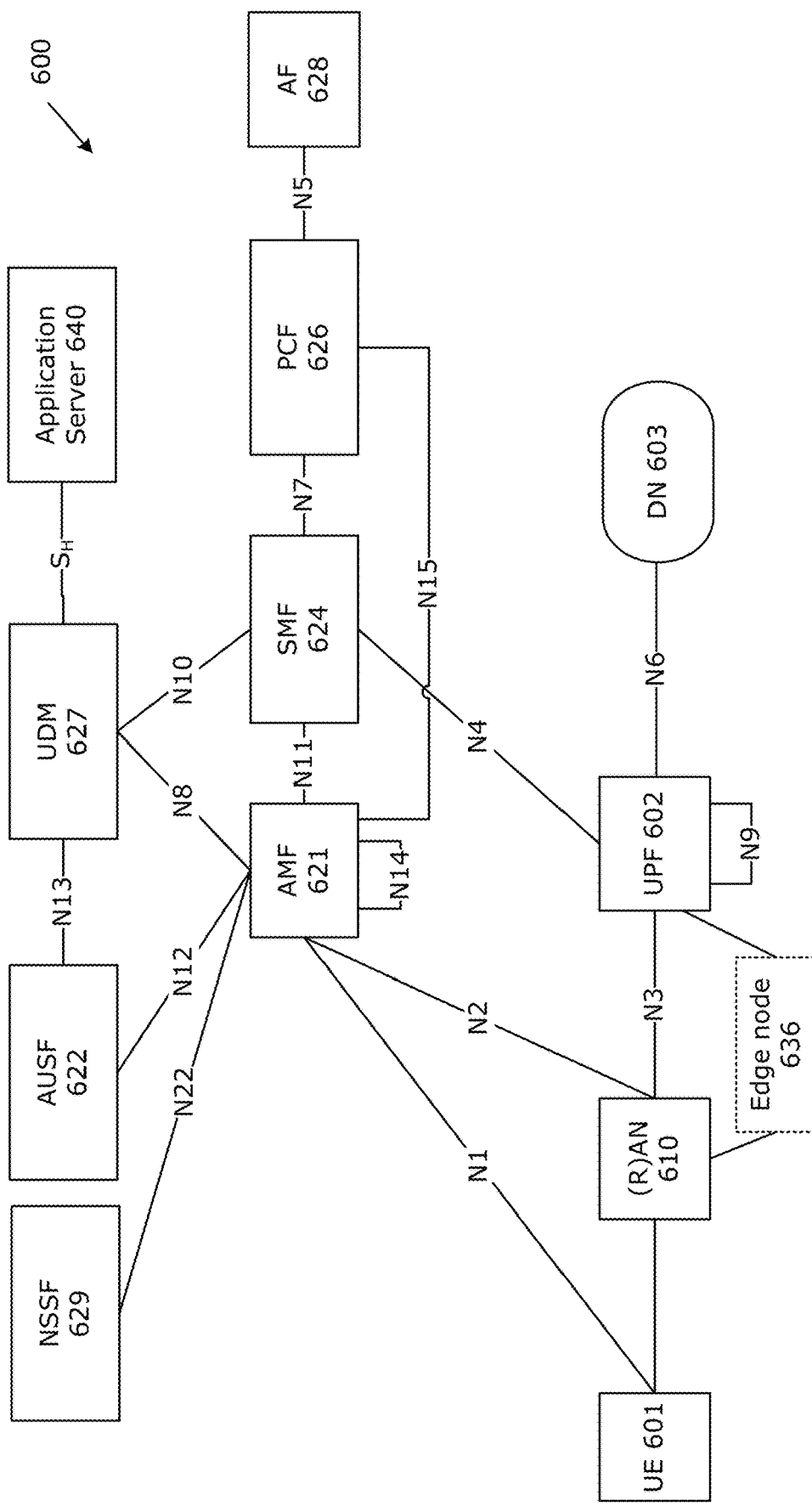
FIGS. 6 and 7 illustrate example core network architectures according to various embodiments.
Figure 7:
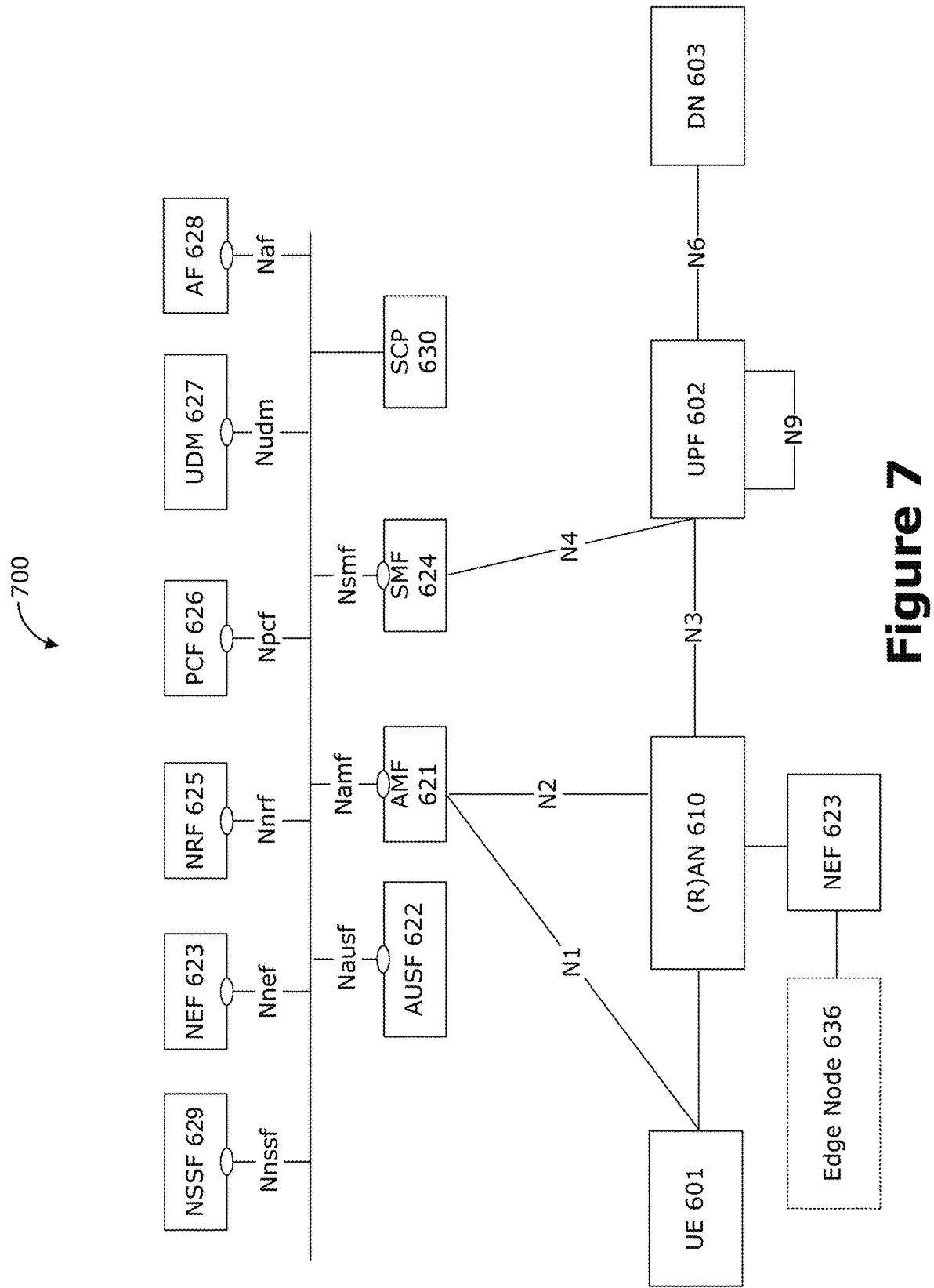

The security aspects discussed herein are based on the CIoT architecture discussed in [TR23724] where E-UTRAN (e.g., both wideband (WB)-E-UTRA and NB-IoT) is connected to 5GC (e.g., 5GC 540 in FIG. 5) via N2/N3 reference points (see e.g., FIGS. 6 and 7). For purposed of the present disclosure, the UEs 502 used for CIoT in the 5GS are assumed to comply with the security features and security requirements in [TS33501].

2. Embodiments for UE Capability Transfer for UEs with No Access Stratum Security Embodiments herein provide security protection for UE capability transfer. A UE 502 (see e.g., FIG. 5) using CIoT control plane (CP) optimizations does not have access stratum (AS) security establishment. As a result, the existing solutions for normal UEs 502 (e.g., non-IoT UEs 502) to protect the UE capability transfer does not prevent tampering of UE capability transfer using MITM attack as described previously. In various embodiments, NAS based keys are used to protect the UE capability transfer from UE 502 to the core network 520 (see e.g., FIG. 5).

FIG. 1 illustrates an example UE Capability Transfer procedure 100 for UEs with no Access Stratum (AS) Security, according to various embodiments. The procedure 100 is performed among UE 502, Radio Access Network (RAN) 504, and a network (NW) 120. The NW 120 may be the Core Network (CN) 520 or a specific network function (NF) in the CN 520 such as, for example, the AMF 621 and/or AUSF 622 shown and described with respect to FIGS. 6 and 7, an Authentication credential Repository and Processing Function (ARPF), a Subscription Identifier De-concealing Function (SIDF), and/or a Security Anchor Function (SEAF).

In FIG. 1, the NW 120 initiates a UE capability enquiry procedure to a UE in RRC_CONNECTED when it needs (additional) UE radio access capability information. At step 1*a*, the RAN 504 sends a NAS UE capability indication message to the NW 120 (e.g., Request UECapabiltiyEnquiry). The NW 120 calculates a downlink Message Authentication Code (DL_MAC) using a currently used NAS integrity algorithm with a $K_{NASint}$ as the key and the UE Capability enquiry message as an input. Optionally, the NW 120 performs encryption on the UE Capability Enquiry message using currently used NAS encryption algorithm and $K_{NASenc}$ as the key. At step 1*b*, the RAN 504 receives the DL_MAC and optionally encrypted payload for the UE capability enquiry message. The DL_MAC may be sent to the RAN 504 with a counter.

At step 2, the RAN 504 sends the UE Capability Enquiry, optionally encrypted, along with DL_MAC, counter. Upon receiving the UE capability enquiry, the UE 502 calculates an uplink Message Authentication Code (UL_MAC) for UE capability information using $K_{NASint}$ and currently used NAS integrity algorithm and a counter. In embodiments, the UE 502 first verifies the message using $K_{NASint}$ and optionally decrypts the message using $K_{NASenc}$. If successful, the UE 502 calculates UL_MAC for UE capability information using the $K_{NASint}$ and currently used NAS integrity algorithm and the counter. Optionally, the UE 502 encrypts the UE capability information IE using the $K_{NASenc}$ outside of the PDCP layer. At step 3, the UE 502 sends the UE capability information message to the RAN 504 along with UL_MAC and optionally encrypted Capability IE.

For calculation of Message Authentication Code (MAC), in some embodiments, the UE 502 can first calculate a hash of UE capability and then calculate the MAC. All key derivations (including input parameter encoding) for 5GC may be performed using the key derivation function (KDF) specified in Annex A of [TS33501] and/or Annex B.2.0 of 3GPP TS 33.220 v16.0.0 (Sep. 25, 2019). In a first embodiment, UL_MAC=KDF ($K_{NASint}$, UE capability, Counter). In a second embodiment, UL_MAC=KDF($K_{NASint}$, UE Capability ID, Counter). In a third embodiment, UL_MAC=KDF ($K_{NASint}$, Hash of UE capability, Counter).

At step 4, the RAN 504 forwards the UL_MAC, counter, and optionally encrypted Capability IE to the NW 120 for verification. Upon successful verification, at step 5 the NW 120 sends decrypted capability information and notification to the RAN 504. Additionally or alternatively, upon successful verification, AMF 621 stores the verified radio capability information.

Figure 2:
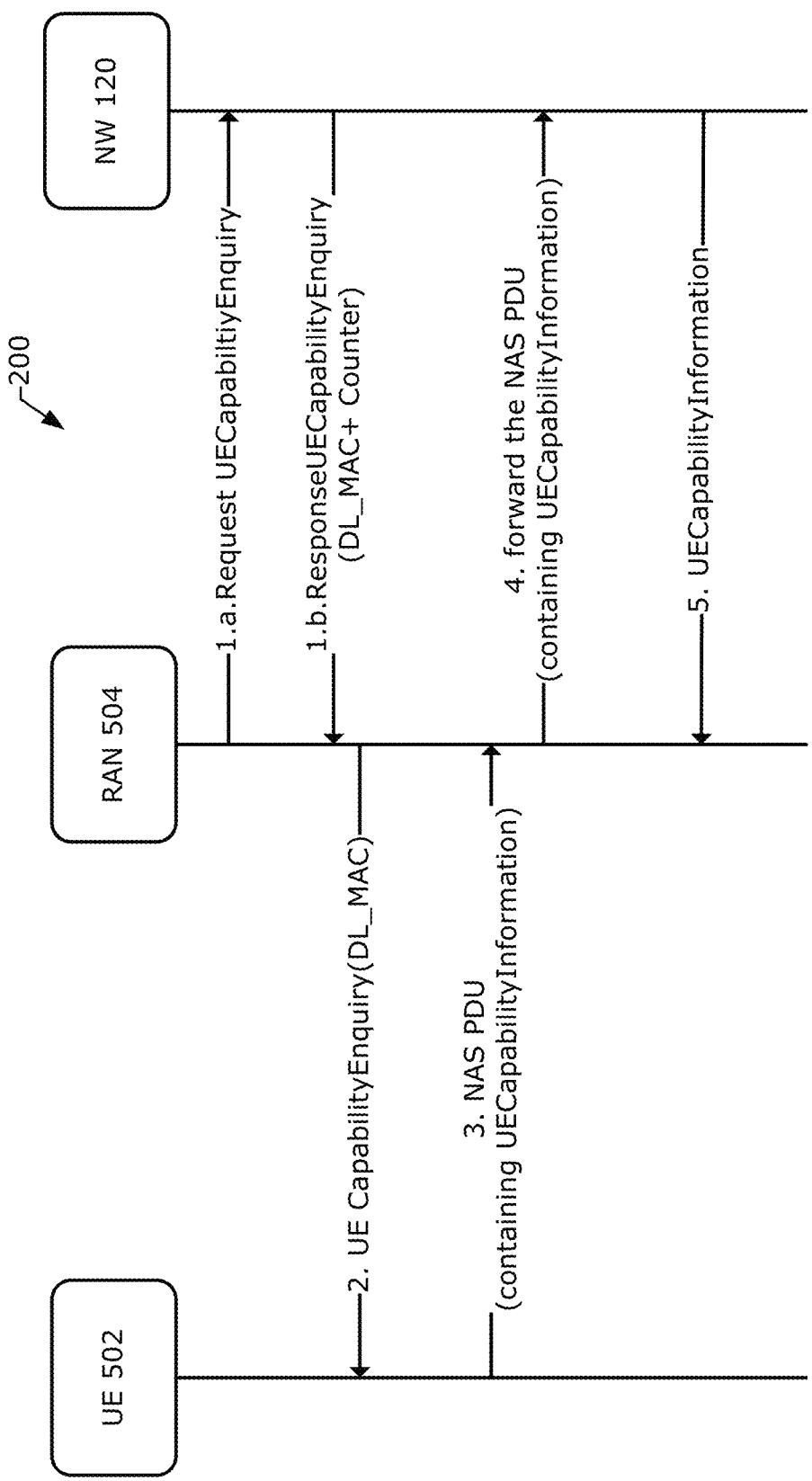
FIG. 2 illustrates an example control plane based UE Capability Transfer for UEs with No AS Security, according to various embodiments.

FIG. 2 illustrates an example control plane based UE Capability Transfer procedure 200 for UEs with No AS Security, according to various embodiments. Procedure 200 includes steps 1*a*, 1*b*, and 2, which are the same as steps 1*a*, 1*b*, and 2 in procedure 100 of FIG. 1.

Upon receiving the UE capability enquiry at step 2, the UECapabilityInformation message is built by the UE 502. This message is forwarded to upper layer(s) and the upper layer(s) (e.g., NAS 1157 in FIG. 11) to prepare a NAS protocol data unit (PDU) containing a container for the UECapabilityInformation message. In some embodiments, the existing NAS security mechanisms are used in the NAS PDU so no additional security parameters are needed.

At step 3, the RRC layer at the UE 502 (e.g., RRC 1155 in FIG. 11) sends the NAS PDU (as DedicatedInfoNAS) in the RRC message (e.g., ULInformationTransfer message). At step 4, the RAN 504 forwards this message to the NW 120 (e.g., MME or AMF 621) and the NW 120 (e.g., MME or AMF 621) decrypts the message and provides the UECapabilityInformation to the RAN 504 at step 5. In one embodiment, the NW 120 (e.g., MME or AMF 621) can forward whole ULInformationTransfer message back to RAN 504, and the RAN 504 will provide the UE radio and paging capability information to the NW 120 (e.g., MME or AMF 621). In another embodiment, the NW 120 (e.g., MME or AMF 621) keeps a copy of the radio capability so that RAN 504 does not need to provide it to the NW 120 (e.g., MME or AMF 621).

The NAS based modeling can also be used to securely provide other RRC configuration to the UE 502 when the UE 502 is using CP CIoT EPS/5GS optimization with no AS security enabled. For example, a cell specific configuration (e.g., cell Radio Network Temporary Identifier (C-RNTI) or Radio Network Temporary Identifier (RNTI) to be used for preconfigured uplink resource (PUR), etc.) is assigned by a cell. Then, the RAN 504 forwards this RNTI to the NW 120 (e.g., MME or AMF 621) and the NW 120 (e.g., MME or AMF 621) includes the RNTI in a NAS PDU and sends it to the UE 502. The NAS layer at the UE 502 (e.g., NAS 1157 in FIG. 11) receives the NAS PDU, retrieves the RNTI, and provides the RNTI to the RRC layer (e.g., RRC 1155 in FIG. 11).

In some embodiments, the RRC layer (e.g., RRC 1155 in FIG. 11) itself can also perform the encryption algorithm using the keys provided by NAS. It can also temporality resume the PDCP layer for this purpose. It can also forward the RRC message to upper layer to perform the encryption. In these embodiments, the UECapabilityEnquiry message can be extended non-critically to include additional parameters for the integrity protection and encryption using the NAS key. For NB-IoT, when using SRB1-bis (e.g., CP CIoT EPS/5GS optimization is used), an example of non-critical extension is shown by the UECapabilityEnquiry-NB of Table 1.

The UECapabilityEnquiry-NB message is used to request the transfer of UE radio access capabilities for NB-IoT. The signalling radio bearer is SRB1 or SRB1bis, RLC-SAP is AM, the Logical channel is DCCH, and the direction is E-UTRAN 510 (or NG-RAN 510) to UE 502.

TABLE 1

| UECapabilityEnquiry-NB message |
|---|

```
-- ASN1START
UECapabilityEnquiry-NB ::=     SEQUENCE {
    rrc-TransactionIdentifier         RRC-TransactionIdentifier,
    criticalExtensions                CHOICE {
        c1                            CHOICE {
            ueCapabilityEnquiry-r13       UECapabilityEnquiry-NB-r13-IEs,
            spare1                        NULL
        },
        criticalExtensionsFuture      SEQUENCE { }
    }
}
UECapabilityEnquiry-NB-r13-IEs ::=    SEQUENCE {
    lateNonCriticalExtension          OCTET STRING                          OPTIONAL,
    nonCriticalExtension              UECapabilityEnquiry-NB-v16xy-IEs      OPTIONAL
}
UECapabilityEnquiry-NB-v16xy-IEs ::=  SEQUENCE {
    enryptionKey-r16                      SEQUENCE {
        dl-NAS-MAC-r16                        BIT STRING (SIZE (16)),
        dl-NAS-Count-r16                      BIT STRING (SIZE (5))
    } OPTIONAL,
    nonCriticalExtension                  SEQUENCE { }      OPTIONAL
}
-- ASN1STOP
```

In one option, critical extension is used and an indication is included to determine whether the UE capability enquiry message itself is encrypted or not. An example is shown below.

If RRC receives "encryption-Enabled" set to true, then it provides the whole UECapabilityEnquiry-r8-IEs (or HASH code of UECapabilityEnquiry-r8-IEs), dl-NAS-MAC-r16 and dl-NAS-Count-r16 to upper layers. The upper layer verifies the UE capability enquiry message and sends the enquiry message to RRC after decryption.

The UECapabilityEnquiry message of Table 2 is used to request the transfer of UE radio access capabilities for E-UTRA as well as for other RATs (e.g., 5G/NR). The signalling radio bearer is SRB1, RLC-SAP is AM, the Logical channel is DCCH, and the direction is E-UTRAN 510 (or NG-RAN 510) to UE 502.

TABLE 2

| UECapabilityEnquiry message |
|---|

```
-- ASN1START
UECapabilityEnquiry ::=           SEQUENCE {
    rrc-TransactionIdentifier         RRC-TransactionIdentifier,
    criticalExtensions                CHOICE {
        c1                            CHOICE {
            ueCapabilityEnquiry-r8        UECapabilityEnquiry-r8-IEs,
            ueCapabilityEnquiry-r16       UECapabilityEnquiry-r16-IEs,
            spare3 NULL, spare2 NULL, spare1 NULL
```

TABLE 2-continued

| UECapabilityEnquiry message |
|---|

```
    },
        criticalExtensionsFuture    SEQUENCE { }
    }
}
UECapabilityEnquiry-r16-IEs ::= SEQUENCE {
    encryption-Enabled-16       ENUMERATED {true, false},
    ueCapabilityEnquiry-r16     OCTET STRING (CONTAINING UECapabilityEnquiry-r8-
IEs),
    enryptionKey-r16            SEQUENCE {
        dl-NAS-MAC-r16          BIT STRING (SIZE (16)),
        dl-NAS-Count-r16        BIT STRING (SIZE (5))
    } OPTIONAL,
    nonCriticalExtension        SEQUENCE { }     OPTIONAL
}
```

When RRC receives the enquiry message, it builds the UECapabilityInformation message. It can itself perform the encryption using the keys provided by NAS or it provides the UECapabilityInformation message as container to upper layers which encrypts the message sends back to RRC layer. Then RRC can send the encrypted UECapabilityInformation message together with NAS count and NAS MAC information.

In another option, the UE capability IEs (e.g., UE-Capability-NB-r13, UE-RadioPagingInfo-NB-r13 and UE-Capability-NB-Ext-r14-IEs) are separately encrypted and sent. In this case, existing S1 messages can be re-used by RAN to send these IEs with additional new indication of encryption to core network (e.g., MME).

A new critical extension of UECapabilityInformation message with UECapabilityInformation-r8-IEs as container can be defined. A new NAS TRANSPORT message type can be defined to carry the encrypted UE capability message.

For NB-IoT, when using SRB1-bis (i.e., CP CIoT EPS/5GS optimization is used), an example of non-critical extension is shown by the UECapabilityInformation-NB message of Table 3. The UECapabilityInformation-NB message is used to transfer of UE radio access capabilities requested by the E-UTRAN. The signalling radio bearer is SRB1 or SRB1bis, RLC-SAP is AM, the Logical channel is DCCH, and the direction is UE 502 to E-UTRAN 510 (or NG-RAN 510).

TABLE 3

| UECapabilityInformation-NB message |
|---|

```
-- ASN1START
UECapabilityInformation-NB ::= SEQUENCE {
        rrc-TransactionIdentifier         RRC-TransactionIdentifier,
        criticalExtensions                CHOICE{
            ueCapabilityInformation-r13       UECapabilityInformation-NB-r13-IEs,
            criticalExtensionsFuture          CHOICE {
                ueCapabilityInformation-r16       UECapabilityInformation-NB-r16-IEs,
                criticalExtensionsFuture-r16          SEQUENCE { }
            }
        }
}
UECapabilityInformation-NB-r16-IEs ::= SEQUENCE {
    encryption-Enabled-16        ENUMERATED {true, false},
    ue-Capability-Container-r16  OCTET STRING (CONTAINING UECapabilityInformation-NB-
r13-IEs),
        ul-NAS-MAC-r16           BIT STRING (SIZE (16)),
        ul-NAS-Count-r16         BIT STRING (SIZE (5)),
        nonCriticalExtension     SEQUENCE { }                            OPTIONAL
}
UECapabilityInformation-NB-r13-IEs ::= SEQUENCE {
        ue-Capability-r13        UE-Capability-NB-r13,
        ue-RadioPagingInfo-r13    UE-RadioPagingInfo-NB-r13,
        lateNonCriticalExtension OCTET STRING        OPTIONAL,
        nonCriticalExtension     UECapabilityInformation-NB-Ext-r14-IEs    OPTIONAL
}
UECapabilityInformation-NB-Ext-r14-IEs ::=   SEQUENCE {
    ue-Capability-ContainerExt-r14   OCTET STRING (CONTAINING UE-Capability-NB-Ext-
r14-IEs),
        nonCriticalExtension              SEQUENCE { }                    OPTIONAL
}
-- ASN1STOP
```

Figure 3:
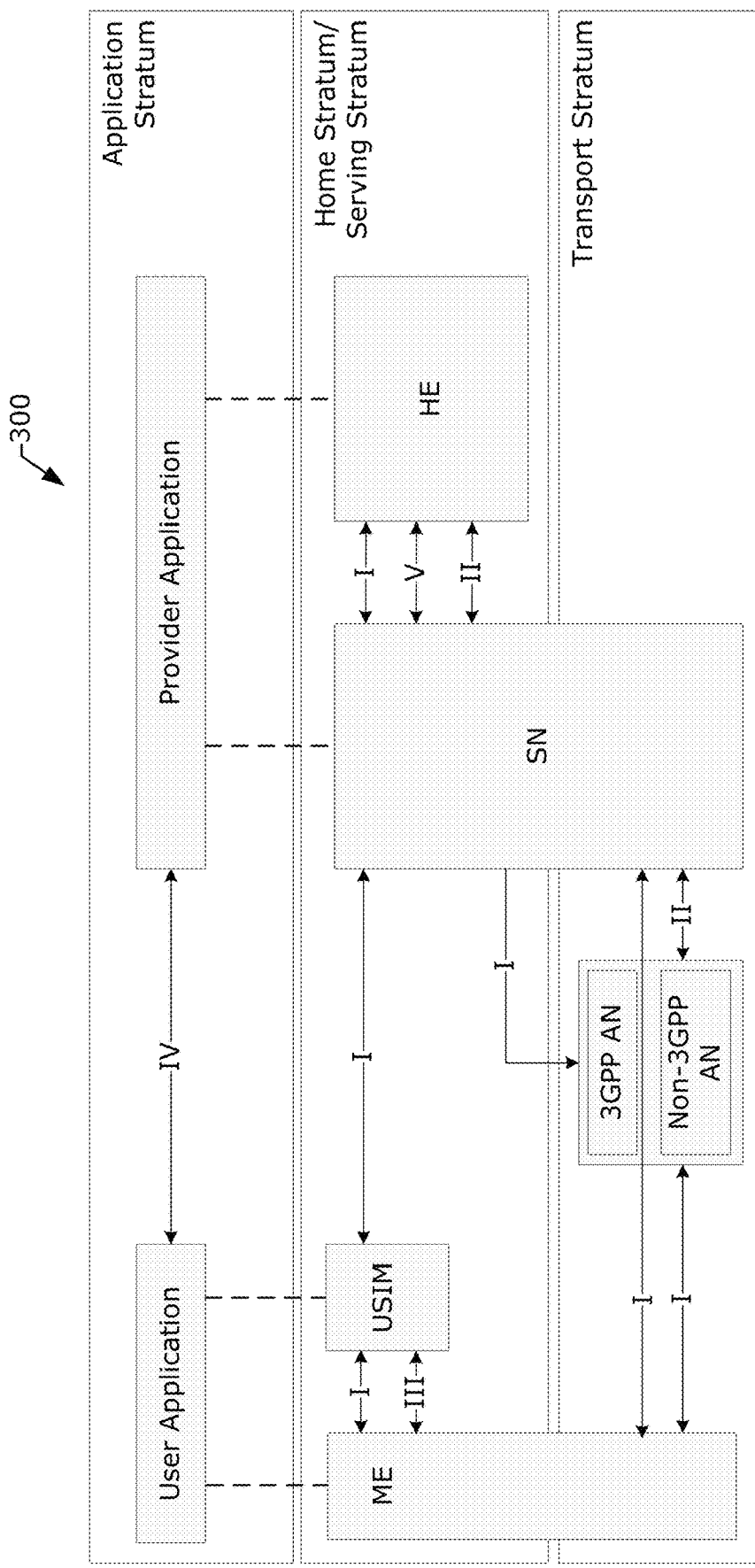
FIG. 3 illustrates an example security architecture, according to various embodiments.

FIG. 3 illustrates an example security architecture 300, according to various embodiments. The security architecture 300 includes an Application Stratum, a Home Stratum/Serving Stratum, and a Transport Stratum. The Application Stratum includes a User Application and a Provider Application. The Home Stratum/Serving Stratum includes the Mobile Equipment (ME), Universal Subscriber Identity Module (USIM), and Home Environment (HE). The Transport Stratum includes a 3GPP Access Network (AN) (e.g., AN 508 of FIG. 5), non-3GPP AN. Additionally, a Secondary Node (SN) is included in both the Home Stratum/Serving Stratum and the Transport Stratum.

The security architecture 300 also includes the following security domains: Network access security (I), which is the set of security features that enable a UE to authenticate and access services via the network securely, including the 3GPP access and Non-3GPP access, and in particularly, to protect against attacks on the (radio) interfaces. In addition, it includes the security context delivery from SN to AN for the access security. Network domain security (II), which is the set of security features that enable network nodes to securely exchange signalling data and user plane data. User domain security (III), which is the set of security features that secure the user access to mobile equipment. Application domain security (IV), which is the set of security features that enable applications in the user domain and in the provider domain to exchange messages securely. Application domain security is out of scope of the present document. Service-Based Architecture (SBA) domain security (V), which is the set of security features that enables network functions of the SBA architecture to securely communicate within the serving network domain and with other network domains. Such features include network function registration, discovery, and authorization security aspects, as well as the protection for the service-based interfaces. SBA domain security is a new security feature compared to 3GPP TS 33.401. Visibility and configurability of security (VI), which is the set of features that enable the user to be informed whether a security feature is in operation or not. The visibility and configurability of security is not shown in FIG. 3.

Figure 4:
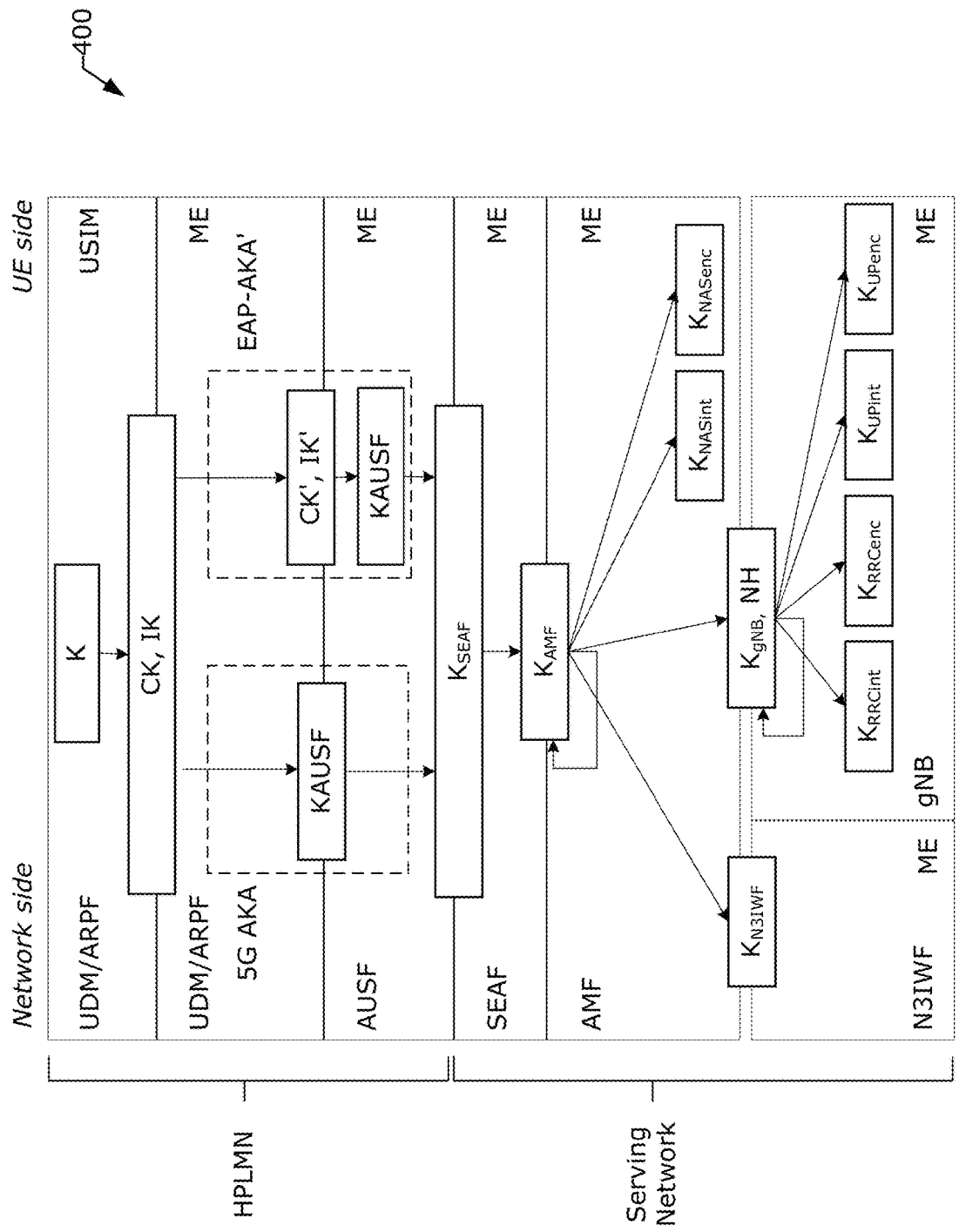
FIG. 4 illustrates an example key hierarchy generation in 5GS, according to various embodiments.

FIG. 4 illustrates an example key hierarchy generation scheme 400, according to various embodiments. The keys related to authentication in FIG. 4 include the following keys: K, CK/IK. In case of EAP-AKA', the keys CK', IK' are derived from CK, IK as specified in clause 6.1.3.1 of [TS33501]. The key hierarchy in FIG. 4 includes the following keys: $K_{AUSF}$, $K_{SEAF}$, $K_{AMF}$, $K_{NASint}$, $K_{NASenc}$, $K_{N3IWF}$, $K_{gNB}$, $K_{RRCint}$, $K_{RRCenc}$, $K_{UPint}$ and $K_{UPenc}$.

Keys for AUSF 622 in a home network include the $K_{AUSF}$, which is a key derived by ME (see e.g., FIG. 3) and AUSF 622 from CK', IK' in case of EAP-AKA', CK' and IK' is received by AUSF 622 as a part of transformed authentication vector (AV) from ARPF. Alternatively, the $K_{AUSF}$ is derived by the ME and ARPF from CK, IK in case of 5G AKA, $K_{AUSF}$ is received by AUSF 622 as a part of the 5G Home Environment Authentication Vector (5G HE AV) from ARPF.

The key for AMF 621 in the serving network is the $K_{AMF}$, which is a key derived by ME and SEAF from $K_{SEAF}$. The $K_{AMF}$ is further derived by ME and source AMF when performing horizontal key derivation.

Keys for NAS signalling include $K_{NASint}$ and $K_{NASenc}$. $K_{NASint}$ is a key derived by the ME (see e.g., FIG. 3) and AMF 621 from $K_{AMF}$, which is only used for the protection of NAS signalling with a particular integrity algorithm. The $K_{NASenc}$ is a key derived by ME and AMF from $K_{AMF}$, which shall only be used for the protection of NAS signalling with a particular encryption algorithm The Key for NG-RAN 514 is $K_{gNB}$ which is a key derived by ME and AMF from $K_{AMF}$. $K_{gNB}$ is further derived by ME and source gNB when performing horizontal or vertical key derivation. The $K_{gNB}$ is used as $K_{eNB}$ between ME and ng-eNB.

Keys for user plane (UP) traffic include $K_{UPenc}$ and $K_{UPint}$. The $K_{UPenc}$ is a key derived by ME and gNB from $K_{gNB}$, which shall only be used for the protection of UP traffic with a particular encryption algorithm. The $K_{UPint}$ is a key derived by ME and gNB from $K_{gNB}$, which shall only be used for the protection of UP traffic between ME and gNB with a particular integrity algorithm.

Keys for RRC signalling include $K_{RRCint}$ and $K_{RRCenc}$. $K_{RRCint}$ is a key derived by ME and gNB from $K_{gNB}$, which shall only be used for the protection of RRC signalling with a particular integrity algorithm. The $K_{RRCenc}$ is a key derived by ME and gNB from $K_{gNB}$, which shall only be used for the protection of RRC signalling with a particular encryption algorithm.

Intermediate keys include NH, $K_{NG-RAN}*$, and $K'_{AMF}$. The NH is a key derived by ME and AMF to provide forward security as described in Clause A.10 of [TS33501]. The $K_{NG-RAN}*$ is a key derived by ME and NG-RAN 514 (e.g., gNB 516 or ng-eNB 518) when performing a horizontal or vertical key derivation as specified in Clause 6.9. 2.1.1 using a KDF as specified in Clause A.11/A.12 of [TS33501]. The $K'_{AMF}$ is a key that can be derived by ME and AMF when the UE moves from one AMF to another during inter-AMF mobility as specified in Clause 6.9.3 of [TS33501] using a KDF as specified in Annex A.13 of [TS33501].

The key for the non-3GPP access is $K_{N3IWF}$ which is a key derived by ME and AMF from $K_{AMF}$ for the non-3GPP access. $K_{N3IWF}$ is not forwarded between N3IWFs.

3. Example Systems and Device Configurations and Arrangements

Referring now to FIG. 5, which illustrates a network 500 in accordance with various embodiments. The network 500 may operate in a manner consistent with 3GPP technical specifications for Long Term Evolution (LTE) or 5G/NR systems. However, the example embodiments are not limited in this regard and the described embodiments may apply to other networks that benefit from the principles described herein, such as future 3GPP systems, or the like.

The network 500 includes a UE 502, which is any mobile or non-mobile computing device designed to communicate with a RAN 504 via an over-the-air connection. The UE 502 is communicatively coupled with the RAN 504 by a Uu interface, which may be applicable to both LTE and NR systems. Examples of the UE 502 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 500 may include a plurality of UEs 502 coupled directly with one another via a D2D, ProSe, PC5, and/or sidelink (SL) interface. These UEs 502 may be M2M/D2D/MTC/IoT devices and/or vehicular systems that communicate using physical SL channels such as, but not limited to, Physical Sidelink Broadcast Channel (PSBCH), Physical Sidelink Discovery Channel (PSDCH), Physical Sidelink Shared Channel (PSSCH), Physical Sidelink Control Channel (PSCCH), Physical Sidelink Feedback Channel (PSFCH), etc.

In some embodiments, the UE 502 may additionally communicate with an AP 506 via an over-the-air (OTA) connection. The AP 506 manages a WLAN connection, which may serve to offload some/all network traffic from the RAN 504. The connection between the UE 502 and the AP 506 may be consistent with any IEEE 802.11 protocol. Additionally, the UE 502, RAN 504, and AP 506 may utilize cellular-WLAN aggregation/integration (e.g., LWA/LWIP). Cellular-WLAN aggregation may involve the UE 502 being configured by the RAN 504 to utilize both cellular radio resources and WLAN resources.

The UE 502 may be configured to perform signal and/or cell measurements based on a configuration obtain from the network (e.g., RAN 504). The UE 502 derives cell measurement results by measuring one or multiple beams per cell as configured by the network. For all cell measurement results, the UE 502 applies layer 3 (L3) filtering before using the measured results for evaluation of reporting criteria and measurement reporting. For cell measurements, the network can configure Reference Signal Received Power (RSRP), Reference Signal Received Quality (RSRQ), and/or Signal-to-Interference plus Noise Ratio (SINR) as a trigger quantity. Reporting quantities can be the same as the trigger quantity or combinations of quantities (e.g., RSRP and RSRQ; RSRP and SINR; RSRQ and SINR; RSRP, RSRQ and SINR). In other embodiments, other measurements and/or combinations of measurements may be used as a trigger quantity such as those discussed in 3GPP TS 36.214 v15.3.0 (Sep. 27, 2018) (hereinafter "[TS36214]"), 3GPP TS 38.215 v15.5.0 (Jun. 24, 2019) (hereinafter "[TS38215]"), Institute of Electrical and Electronics Engineers (IEEE) Standards Association, "IEEE Computer Society: "Part 11: Wireless LAN Medium Access Control (MAC) and Physical Layer (PHY) Specifications", IEEE Std 802.11™-2012 (2012) (hereinafter "[IEEE80211]"), and/or the like.

The RAN 504 includes one or more access network nodes (ANs) 508. The ANs 508 terminate air-interface(s) for the UE 502 by providing access stratum protocols including Radio Resource Control (RRC), Packet Data Convergence Protocol (PDCP), Radio Link Control (RLC), Medium Access Control (MAC), and physical (PHY/L1) layer protocols. In this manner, the AN 508 enables data/voice connectivity between CN 520 and the UE 502. The UE 502 and can be configured to communicate using OFDM communication signals with other UEs 502 or with any of the AN 508 over a multicarrier communication channel in accordance with various communication techniques, such as, but not limited to, an OFDMA communication technique (e.g., for DL communications) or a SC-FDMA communication technique (e.g., for UL and SL communications), although the scope of the embodiments is not limited in this respect. The OFDM signals comprise a plurality of orthogonal subcarriers.

The ANs 508 may be a macrocell base station or a low power base station for providing femtocells, picocells or other like cells having smaller coverage areas, smaller user capacity, or higher bandwidth compared to macrocells; or some combination thereof. In these implementations, an AN 508 be referred to as a BS, gNB, RAN node, eNB, ng-eNB, NodeB, RSU, TRxP, etc.

One example implementation is a "CU/DU split" architecture where the ANs 508 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v15.7.0 (Jan. 9, 2020)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 508 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 504 is an LTE RAN or Evolved Universal Terrestrial Radio Access Network (E-UTRAN) 510) or an Xn interface (if the RAN 504 is a NG-RAN 514). The X2/Xn interfaces, which may be separated into control/user plane interfaces in some embodiments, may allow the ANs to communicate information related to handovers, data/context transfers, mobility, load management, interference coordination, etc.

The ANs of the RAN 504 may each manage one or more cells, cell groups, component carriers, etc. to provide the UE 502 with an air interface for network access. The UE 502 may be simultaneously connected with a plurality of cells provided by the same or different ANs 508 of the RAN 504. For example, the UE 502 and RAN 504 may use carrier aggregation (CA) to allow the UE 502 to connect with a plurality of component carriers, each corresponding to a PCell or SCell. A PCell is an MCG cell, operating on a primary frequency, in which the UE 502 performs an initial connection establishment procedure and/or initiates a connection re-establishment procedure. An SCell is a cell providing additional radio resources on top of a Special Cell (SpCell) when the UE 502 is configured with CA. In CA, two or more Component Carriers (CCs) are aggregated. The UE 502 may simultaneously receive or transmit on one or multiple CCs depending on its capabilities. A UE 502 with single timing advance capability for CA can simultaneously receive and/or transmit on multiple CCs corresponding to multiple serving cells sharing the same timing advance (multiple serving cells grouped in one timing advance group (TAG)). A UE 502 with multiple timing advance capability for CA can simultaneously receive and/or transmit on multiple CCs corresponding to multiple serving cells with different timing advances (multiple serving cells grouped in multiple TAGs). The NG-RAN 514 ensures that each TAG contains at least one serving cell; A non-CA capable UE 502 can receive on a single CC and transmit on a single CC corresponding to one serving cell only (one serving cell in one TAG). CA is supported for both contiguous and non-contiguous CCs. When CA is deployed frame timing and SFN are aligned across cells that can be aggregated, or an offset in multiples of slots between the PCell/PSCell and an SCell is configured to the UE 502. In some implementations, the maximum number of configured CCs for a UE 502 is 16 for DL and 16 for UL.

In Dual Connectivity (DC) scenarios, a first AN 508 may be a master node that provides a Master Cell Group (MCG) and a second AN 508 may be secondary node that provides an Secondary Cell Group (SCG). The first and second ANs 508 may be any combination of eNB, gNB, ng-eNB, etc. The MCG is a subset of serving cells comprising the PCell and zero or more SCells. The SCG is a subset of serving cells comprising the PSCell and zero or more SCells. As alluded to previously, DC operation involves the use of PSCells and SpCells. A PSCell is an SCG cell in which the UE 502 performs random access (RA) when performing a reconfiguration with Sync procedure, and an SpCell for DC operation is a PCell of the MCG or the PSCell of the SCG; otherwise the term SpCell refers to the PCell. Additionally, the PCell, PSCells, SpCells, and the SCells can operate in the same frequency range (e.g., FR1 or FR2), or the PCell, PSCells, SpCells, and the SCells can operate in different frequency ranges. In one example, the PCell may operate in a sub-6 GHz frequency range/band and the SCell can operate at frequencies above 24.25 GHz (e.g., FR2).

The RAN 504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In some embodiments, the RAN 504 may be an E-UTRAN 510 with one or more eNBs 512. The E-UTRAN 510 provides an LTE air interface (Uu) with the following characteristics: subcarrier spacing (SCS) of 15 kHz; cyclic prefix (CP)-OFDM waveform for DL and SC-FDMA waveform for UL; turbo codes for data and TBCC for control; etc. The LTE air interface may rely on channel state information reference signals (CSI-RS) for channel state information (CSI) acquisition and beam management; Physical Downlink Shared Channel (PDSCH)/Physical Downlink Control Channel (PDCCH) Demodulation Reference Signal (DMRS) for PDSCH/PDCCH demodulation; and cell-specific reference signals (CRS) for cell search and initial acquisition, channel quality measurements, and channel estimation for coherent demodulation/detection at the UE. The LTE air interface may operating on sub-6 GHz bands.

In some embodiments, the RAN 504 may be an next generation (NG)-RAN 514 with one or more gNB 516 and/or on or more ng-eNB 518. The gNB 516 connects with 5G-enabled UEs 502 using a 5G NR interface. The gNB 516 connects with a 5GC 540 through an NG interface, which includes an N2 interface or an N3 interface. The ng-eNB 518 also connects with the 5GC 540 through an NG interface, but may connect with a UE 502 via the Uu interface. The gNB 516 and the ng-eNB 518 may connect with each other over an Xn interface.

In some embodiments, the NG interface may be split into two parts, an NG user plane (NG-U) interface, which carries traffic data between the nodes of the NG-RAN 514 and a UPF (e.g., N3 interface), and an NG control plane (NG-C) interface, which is a signaling interface between the nodes of the NG-RAN 514 and an AMF (e.g., N2 interface).

The NG-RAN 514 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use Physical Broadcast Channel (PBCH) DMRS for PBCH demodulation; Phase Tracking Reference Signals (PTRS) for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an Synchronization Signal Block (SSB) that is an area of a DL resource grid that includes Primary Synchronization Signal (PSS)/Secondary Synchronization Signal (SSS)/PBCH.

The 5G-NR air interface may utilize bandwidth parts (BWPs) for various purposes. For example, BWP can be used for dynamic adaptation of the SCS. A BWP is a subset of contiguous common resource blocks defined in clause 4.4.4.3 of 3GPP TS 38.211 or a given numerology in a BWP on a given carrier. For example, the UE 502 can be configured with multiple BWPs where each BWP configuration has a different SCS. When a BWP change is indicated to the UE 502, the SCS of the transmission is changed as well. Another use case example of BWP is related to power saving. In particular, multiple BWPs can be configured for the UE 502 with different amount of frequency resources (e.g., PRBs) to support data transmission under different traffic loading scenarios. A BWP containing a smaller number of PRBs can be used for data transmission with small traffic load while allowing power saving at the UE 502 and in some cases at the gNB 516. A BWP containing a larger number of PRBs can be used for scenarios with higher traffic load.

The RAN 504 is communicatively coupled to CN 520, which includes network elements and/or network functions (NFs) to provide various functions to support data and telecommunications services to customers/subscribers (e.g., UE 502). The network elements and/or NFs may be implemented by one or more servers 521, 541. The components of the CN 520 may be implemented in one physical node or separate physical nodes. In some embodiments, NFV may be utilized to virtualize any or all of the functions provided by the network elements of the CN 520 onto physical compute/storage resources in servers, switches, etc. A logical instantiation of the CN 520 may be referred to as a network slice, and a logical instantiation of a portion of the CN 520 may be referred to as a network sub-slice.

The CN 520 may be an LTE CN 522 (also referred to as an Evolved Packet Core (EPC) 522). The EPC 522 may include MME, SGW, SGSN, HSS, PGW, PCRF, and/or other NFs coupled with one another over various interfaces (or "reference points") (not shown). The CN 520 may be a 5GC 540 including an AUSF, AMF, SMF, UPF, NSSF, NEF, NRF, PCF, UDM, AF, and/or other NFs coupled with one another over various service-based interfaces and/or reference points (see e.g., FIGS. 6 and 7). The 5GC 540 may enable edge computing by selecting operator/3rd party services to be geographically close to a point that the UE 502 is attached to the network. This may reduce latency and load on the network. In edge computing implementations, the 5GC 540 may select a UPF close to the UE 502 and execute traffic steering from the UPF to DN 536 via the N6 interface. This may be based on the UE subscription data, UE location, and information provided by the AF, which allows the AF to influence UPF (re)selection and traffic routing.

The data network (DN) 536 may represent various network operator services, Internet access, or third party services that may be provided by one or more servers including, for example, application (app)/content server 538. The DN 536 may be an operator external public, a private PDN, or an intra-operator packet data network, for example, for provision of IMS services. In this embodiment, the server 538 can be coupled to an IMS via an S-CSCF or the I-CSCF. In some implementations, the DN 536 may represent one or more local area DNs (LADNs), which are DNs 536 (or DN names (DNNs)) that is/are accessible by a UE 502 in one or more specific areas. Outside of these specific areas, the UE 502 is not able to access the LADN/DN 536.

Additionally or alternatively, the DN 536 may be an Edge DN 536, which is a (local) Data Network that supports the architecture for enabling edge applications. In these embodiments, the app server 538 may represent the physical hardware systems/devices providing app server functionality and/or the application software resident in the cloud or at an edge compute node that performs server function(s). In some embodiments, the app/content server 538 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 510, 514. For example, the edge compute nodes can provide a connection between the RAN 514 and UPF in the 5GC 540. The edge compute nodes can use one or more NFV instances instantiated on virtualization infrastructure within the edge compute nodes to process wireless connections to and from the RAN 514 and a UPF 602.

In some implementations, the system 500 may include an SMSF, which is responsible for SMS subscription checking and verification, and relaying SM messages to/from the UE 502 to/from other entities, such as an SMS-GMSC/IWMSC/SMS-router. The SMS may also interact with AMF and UDM for a notification procedure that the UE 502 is available for SMS transfer (e.g., set a UE not reachable flag, and notifying UDM when UE 502 is available for SMS).

Self-Organizing Network (SON) is introduced to reduce the operating expenditure (OPEX) associated with the management of deployments with a relatively large number of nodes. Automation of some network planning, configuration and optimisation processes via the use of SON functions can help the network operator to reduce OPEX by reducing manual involvement in such tasks. There are four different architectures that are possible for implementing various SON use cases including: Centralised SON (where SON algorithms are executed in the OAM system), and Distributed SON (where SON algorithms are executed at the Network Element level. Centralised SON has two variants: NM-Centralised SON (where SON algorithms are executed at the Network Management (NM) level), and EM-Centralised SON (where SON algorithms are executed at the Element Management (EM) level).

The SON functions may include, for example, Load Balancing Optimization (LBO), Handover (HO) Parameter Optimization, Capacity and Coverage Optimization (CCO) including Centralized CCO and Distributed CCO, Random Access (RACH) Optimization, SON coordination, self-establishment and self-configuration of 3GPP NFs including automated software management, Automatic Neighbour Relation (ANR) management (including automatic X2 and Xn setup), PCI Configuration, automatic radio configuration data (ARCF), interference coordination including inter-cell interference coordination, self-healing, SON for Active Antenna System (AAS)-based Deployments, trace and MDT reporting, Mobility Robustness Optimization (MRO), Energy Saving Management (ESM) (including intra-LTE Energy Saving in LTE networks, intra-5G Energy Saving in 5G networks, and Inter-RAT Energy Saving), NSI resource allocation optimization, Automatic NSI creation, Multi-vendor Plug and Play of NFs, optimization of the quality of communication services, cross-slice network resource optimization, multi-aspect/multi-domain resource optimization, automatic CSI creation as discussed in Error! Reference source not found, Error! Reference source not found, 3GPP TS 32.522 11.7.0 (Sep. 20, 2013), and/or the like.

FIGS. 6 and 7 illustrate example system architectures 600 and 700 (collectively "5GC 600") of a 5GC such as CN 540 of FIG. 5, in accordance with various embodiments. In particular, FIG. 6 shows an exemplary 5G system architecture 600 in a reference point representation where interactions between NFs are represented by corresponding point-to-point reference points Ni, and FIG. 7 illustrates an exemplary 5G system architecture 700 in a service-based representation where interactions between NFs are represented by corresponding service-based interfaces. The system 600 is shown to include a UE 601, which may be the same or similar to the UEs 502 discussed previously; a (R)AN 610, which may be the same or similar to the AN 508 discussed previously; and a DN 603, which may be, for example, operator services, Internet access or 3rd party services, and may correspond with a Packet Data Network in LTE systems; and a 5GC 620. The 5GC 620 may include an Access and Mobility Management Function (AMF) 621; an Authentication Server Function (AUSF) 622; a Session Management Function (SMF) 624; a Network Exposure Function (NEF) 623; a Policy Control Function (PCF) 626; an NF Repository Function (NRF) 625; a Unified Data Management (UDM) 627; an Application Function (AF) 628; a User Plane Function (UPF) 602; a Network Slice Selection Function (NSSF) 629; and a Service Communication Proxy (SCP) 630.

The reference point representation of FIG. 6 shows various interactions between corresponding NFs. For example, FIG. 6 illustrates the following reference points: N1 (between the UE 601 and the AMF 621), N2 (between the RAN 610 and the AMF 621), N3 (between the RAN 610 and the UPF 602), N4 (between the SMF 624 and the UPF 602), N5 (between the PCF 626 and the AF 628), N6 (between the UPF 602 and the DN 603), N7 (between the SMF 624 and the PCF 626), N8 (between the UDM 627 and the AMF 621), N9 (between two UPFs 602), N10 (between the UDM 627 and the SMF 624), N11 (between the AMF 621 and the SMF 624), N12 (between the AUSF 622 and the AMF 621), N13 (between the AUSF 622 and the UDM 627), N14 (between two AMFs 621), N15 (between the PCF 626 and the AMF 621 in case of a non-roaming scenario, or between the PCF 626 and a visited network and AMF 621 in case of a roaming scenario), N16 (between two SMFs; not shown), and N22 (between AMF 621 and NSSF 625). Other reference point representations not shown in FIG. 6 can also be used.

The service-based representation of FIG. 7 represents NFs within the control plane that enable other authorized NFs to access their services. In this regard, 5G system architecture 300 can include the following service-based interfaces: Namf (a service-based interface exhibited by the AMF 621), Nsmf (a service-based interface exhibited by the SMF 624), Nnef (a service-based interface exhibited by the NEF 623), Npcf (a service-based interface exhibited by the PCF 626), Nudm (a service-based interface exhibited by the UDM 627), Naf (a service-based interface exhibited by the AF 628), Nnrf (a service-based interface exhibited by the NRF 625), Nnssf (a service-based interface exhibited by the NSSF 629), Nausf (a service-based interface exhibited by the AUSF 622). Other service-based interfaces (e.g., Nudr, N5g-eir, and Nudsf) not shown in FIG. 7 can also be used. In embodiments, the NEF 623 can provide an interface to Edge node 636, which can be used to process wireless connections with the RAN 610.

The 5GS 600 is assumed to operate with a large number of UEs 601 used for CIoT and capable of appropriately handling overload and congestion situations. UEs 601 used for CIoT can be mobile or nomadic/static, and resource efficiency should be considered for both for relevant optimization(s). The 5GS 600 also supports one or more small data delivery mechanisms using IP data and Unstructured (Non-IP) data.

The AUSF 622 stores data for authentication of UE 601 and handle authentication-related functionality. The AUSF 622 may facilitate a common authentication framework for various access types. The AUSF 622 may communicate with the AMF 621 via an N12 reference point between the AMF 621 and the AUSF 622; and may communicate with the UDM 627 via an N13 reference point between the UDM 627 and the AUSF 622. Additionally, the AUSF 622 may exhibit an Nausf service-based interface.

The AMF 621 allows other functions of the 5GC 600 to communicate with the UE 601 and the RAN 610 and to subscribe to notifications about mobility events with respect to the UE 601. The AMF 621 is also responsible for registration management (e.g., for registering UE 601), connection management, reachability management, mobility management, lawful interception of AMF-related events, and access authentication and authorization. The AMF 621 provides transport for SM messages between the UE 601 and the SMF 624, and acts as a transparent proxy for routing SM messages. AMF 621 also provides transport for SMS messages between UE 601 and an SMSF. AMF 544 interacts with the AUSF 622 and the UE 601 to perform various security anchor and context management functions. Furthermore, AMF 621 is a termination point of a RAN-CP interface, which includes the N2 reference point between the RAN 610 and the AMF 621. The AMF 621 is also a termination point of Non-Access Stratum (NAS) (N1) signaling, and performs NAS ciphering and integrity protection.

The AMF 621 also supports NAS signaling with the UE 601 over an N3IWF interface. The N3IWF provides access to untrusted entities. N3IWF may be a termination point for the N2 interface between the (R)AN 610 and the AMF 621 for the control plane, and may be a termination point for the N3 reference point between the (R)AN 610 and the UPF 602 for the user plane. As such, the AMF 621 handles N2 signalling from the SMF 624 and the AMF 621 for PDU sessions and QoS, encapsulate/de-encapsulate packets for IPSec and N3 tunnelling, marks N3 user-plane packets in the uplink, and enforces QoS corresponding to N3 packet marking taking into account QoS requirements associated with such marking received over N2. N3IWF may also relay UL and DL control-plane NAS signalling between the UE 601 and AMF 621 via an N1 reference point between the UE 601 and the AMF 621, and relay uplink and downlink user-plane packets between the UE 601 and UPF 602. The N3IWF also provides mechanisms for IPsec tunnel establishment with the UE 601. The AMF 621 may exhibit an Namf service-based interface, and may be a termination point for an N14 reference point between two AMFs 640 and an N17 reference point between the AMF 621 and a 5G-EIR (not shown by FIG. 5).

The SMF 624 is responsible for SM (e.g., session establishment, tunnel management between UPF 602 and (R)AN 610); UE IP address allocation and management (including optional authorization); selection and control of UP function; configuring traffic steering at UPF 602 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 621 over N2 to (R)AN 610; and determining SSC mode of a session. SM refers to management of a PDU session, and a PDU session or "session" refers to a PDU connectivity service that provides or enables the exchange of PDUs between the UE 601 and the DN 603.

The UPF 602 acts as an anchor point for intra-RAT and inter-RAT mobility, an external PDU session point of interconnect to data network 603, and a branching point to support multi-homed PDU session. The UPF 602 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 602 may include an uplink classifier to support routing traffic flows to a data network.

The NSSF 629 selects a set of network slice instances serving the UE 601. The NSSF 629 also determines allowed NSSAI and the mapping to the subscribed S-NSSAIs, if needed. The NSSF 629 also determines an AMF set to be used to serve the UE 601, or a list of candidate AMFs 621 based on a suitable configuration and possibly by querying the NRF 625. The selection of a set of network slice instances for the UE 601 may be triggered by the AMF 621 with which the UE 601 is registered by interacting with the NSSF 629; this may lead to a change of AMF 621. The NSSF 629 interacts with the AMF 621 via an N22 reference point; and may communicate with another NSSF in a visited network via an N31 reference point (not shown).

The NEF 623 securely exposes services and capabilities provided by 3GPP NFs for third party, internal exposure/re-exposure, AFs 628, edge computing or fog computing systems (e.g., edge compute node 636, etc. In such embodiments, the NEF 623 may authenticate, authorize, or throttle the AFs 628. NEF 623 may also translate information exchanged with the AF 628 and information exchanged with internal network functions. For example, the NEF 623 may translate between an AF-Service-Identifier and an internal 5GC information. NEF 623 may also receive information from other NFs based on exposed capabilities of other NFs. This information may be stored at the NEF 623 as structured data, or at a data storage NF using standardized interfaces. The stored information can then be re-exposed by the NEF 623 to other NFs and AFs 628, or used for other purposes such as analytics. External exposure of network capabilities towards Services Capabilities Server (SCS)/app server 640 or AF 628 is supported via the NEF 623. Notifications and data from NFs in the Visiting Public Land Mobile Network (VPLMN) to the NEF 623 can be routed through an interworking (IWK)-NEF (not shown), similar to the IWK-Service Capability Exposure Function (SCEF) in an EPC (not shown).

The NRF 625 supports service discovery functions, receives NF discovery requests from NF instances, and provides information of the discovered NF instances to the requesting NF instances. NRF 625 also maintains information of available NF instances and their supported services. The NRF 625 also supports service discovery functions, wherein the NRF 625 receives NF Discovery Request from NF instance or an SCP (not shown), and provides information of the discovered NF instances to the NF instance or SCP.

The PCF 626 provides policy rules to control plane functions to enforce them, and may also support unified policy framework to govern network behavior. The PCF 626 may also implement a front end to access subscription information relevant for policy decisions in a UDR of the UDM 627. In addition to communicating with functions over reference points as shown, the PCF 626 exhibit an Npcf service-based interface.

The UDM 627 handles subscription-related information to support the network entities' handling of communication sessions, and stores subscription data of UE 601. For example, subscription data may be communicated via an N8 reference point between the UDM 627 and the AMF 621. The UDM 627 may include two parts, an application front end and a UDR. The UDR may store subscription data and policy data for the UDM 627 and the PCF 626, and/or structured data for exposure and application data (including PFDs for application detection, application request information for multiple UEs 601) for the NEF 623. The Nudr service-based interface may be exhibited by the UDR 221 to allow the UDM 627, PCF 626, and NEF 623 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 627 may exhibit the Nudm service-based interface.

The AF 628 provides application influence on traffic routing, provide access to NEF 623, and interact with the policy framework for policy control. The AF 628 may influence UPF 602 (re)selection and traffic routing. Based on operator deployment, when AF 628 is considered to be a trusted entity, the network operator may permit AF 628 to interact directly with relevant NFs.

Additionally, the AF 628 may be used for edge computing implementations. The 5GC 600 may enable edge computing by selecting operator/3rd party services to be geographically close to a point that the UE 601 is attached to the network. This may reduce latency and load on the network. In edge computing implementations, the 5GC 600 may select a UPF 602 close to the UE 502 and execute traffic steering from the UPF 602 to DN 603 via the N6 interface. This may be based on the UE subscription data, UE location, and information provided by the AF 628, which allows the AF 628 to influence UPF (re)selection and traffic routing.

The DN 603 may represent various network operator services, Internet access, or third party services that may be provided by one or more servers including, for example, application (app)/content server 640. The DN 603 may be an operator external public, a private PDN, or an intra-operator packet data network, for example, for provision of IMS services. In this embodiment, the app server 640 can be coupled to an IMS via an S-CSCF or the I-CSCF. In some implementations, the DN 603 may represent one or more local area DNs (LADNs), which are DNs 603 (or DN names (DNNs)) that is/are accessible by a UE 601 in one or more specific areas. Outside of these specific areas, the UE 601 is not able to access the LADN/DN 603.

In some implementations, the application programming interfaces (APIs) for CIoT related services provided to the SCS/app server 640 is/are common for UEs 601 connected to an EPS and 5GS 600 and accessed via an Home Public Land Mobile Network (HPLMN). The level of support of the APIs may differ between EPS and 5GS. CIoT UEs 601 can simultaneously connect to one or multiple SCSs/app servers 640 and/or Afs 628.

In some implementations, the DN 603 may be, or include, one or more edge compute nodes 636. Additionally or alternatively, the DN 603 may be an Edge DN 603, which is a (local) Data Network that supports the architecture for enabling edge applications. In these embodiments, the app server 640 may represent the physical hardware systems/devices providing app server functionality and/or the application software resident in the cloud or at an edge compute node 636 that performs server function(s). In some embodiments, the app/content server 640 provides an edge hosting environment that provides support required for Edge Application Server's execution.

In some embodiments, the 5GS can use one or more edge compute nodes 636 to provide an interface and offload processing of wireless communication traffic. In these embodiments, the edge compute nodes 636 may be included in, or co-located with one or more RANs 610. For example, the edge compute nodes 636 can provide a connection between the RAN 610 and UPF 602 in the 5GC 600. The edge compute nodes 636 can use one or more NFV instances instantiated on virtualization infrastructure within the edge compute nodes 636 to process wireless connections to and from the RAN 610 and UPF 602.

In embodiments, the edge node 636 may include or be part of an edge system (or edge network). The edge node 636 may also be referred to as "edge hosts 636" or "edge servers 636." The edge system includes a collection of edge servers 636 and edge management systems (not shown) necessary to run edge computing applications within an operator network or a subset of an operator network. The edge servers 636 are physical computer systems that may include an edge platform and/or virtualization infrastructure, and provide compute, storage, and network resources to edge computing applications. Each of the edge servers 636 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 501, 601 The VI of the edge servers 636 provide virtualized environments and virtualized resources for the edge hosts, and the edge computing applications may run as VMs and/or application containers on top of the VI. Various edge computing/networking technologies in various combinations and layouts of devices located at the edge of a network may be used. Examples of such edge computing/networking technologies that may implement the embodiments herein include ETSI MEC; CDNs Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

The SCP 630 (or individual instances of the SCP 630) supports indirect communication (see e.g., [TS23501] section 7.1.1); delegated discovery (see e.g., [TS23501] section 7.1.1); message forwarding and routing to destination NF/NF service(s), communication security (e.g., authorization of the NF Service Consumer to access the NF Service Producer API) (see e.g., [TS33501]), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., [TS23501] section 6.3). Load balancing, monitoring, overload control functionality provided by the SCP may be implementation specific. The SCP 230 may be deployed in a distributed manner. More than one SCP 630 can be present in the communication path between various NF Services. The SCP 630, although not an NF instance, can also be deployed distributed, redundant, and scalable.

The system architecture 600/300 may also include other elements that are not shown by FIG. 6 or 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

In another example, the 5G system architecture 600 includes an IP multimedia subsystem (IMS) as well as a plurality of IP multimedia core network subsystem entities, such as call session control functions (CSCFs) (not shown by FIG. 6 or 3). More specifically, the IMS includes a CSCF, which can act as a proxy CSCF (P-CSCF), a serving CSCF (S-CSCF), an emergency CSCF (E-CSCF), or interrogating CSCF (I-CSCF). The P-CSCF can be configured to be the first contact point for the UE 601 within the IMS. The S-CSCF can be configured to handle the session states in the network, and the E-CSCF can be configured to handle certain aspects of emergency sessions such as routing an emergency request to the correct emergency center or public safety answering point (PSAP). The I-CSCF can be configured to function as the contact point within an operator's network for all IMS connections destined to a subscriber of that network operator, or a roaming subscriber currently located within that network operator's service area. In some aspects, the I-CSCF can be connected to another IP multimedia network, for example, an IMS operated by a different network operator.

In some implementations, the 5GS architecture also includes a Security Edge Protection Proxy (SEPP) as an entity sitting at the perimeter of the PLMN for protecting control plane messages. The SEPP enforces inter-PLMN security on the N32 interface. The 5GS architecture may also include an Inter-PLMN UP Security (IPUPS) at the perimeter of the PLMN for protecting user plane messages. The IPUPS is a functionality of the UPF 602 that enforces GTP-U security on the N9 interface between UPFs 602 of the visited and home PLMNs. The IPUPS can be activated with other functionality in a UPF 602 or activated in a UPF 602 that is dedicated to be used for IPUPS functionality (see e.g., [TS23501], clause 5.8.2.14).

Additionally, there may be many more reference points and/or service-based interfaces between the NF services in the NFs; however, these interfaces and reference points have been omitted from FIGS. 6 and 7 for clarity. In one example, the CN 620 may include an Nx interface, which is an inter-CN interface between the MME and the AMF 621 in order to enable interworking between system 200 and an EPC. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 8:
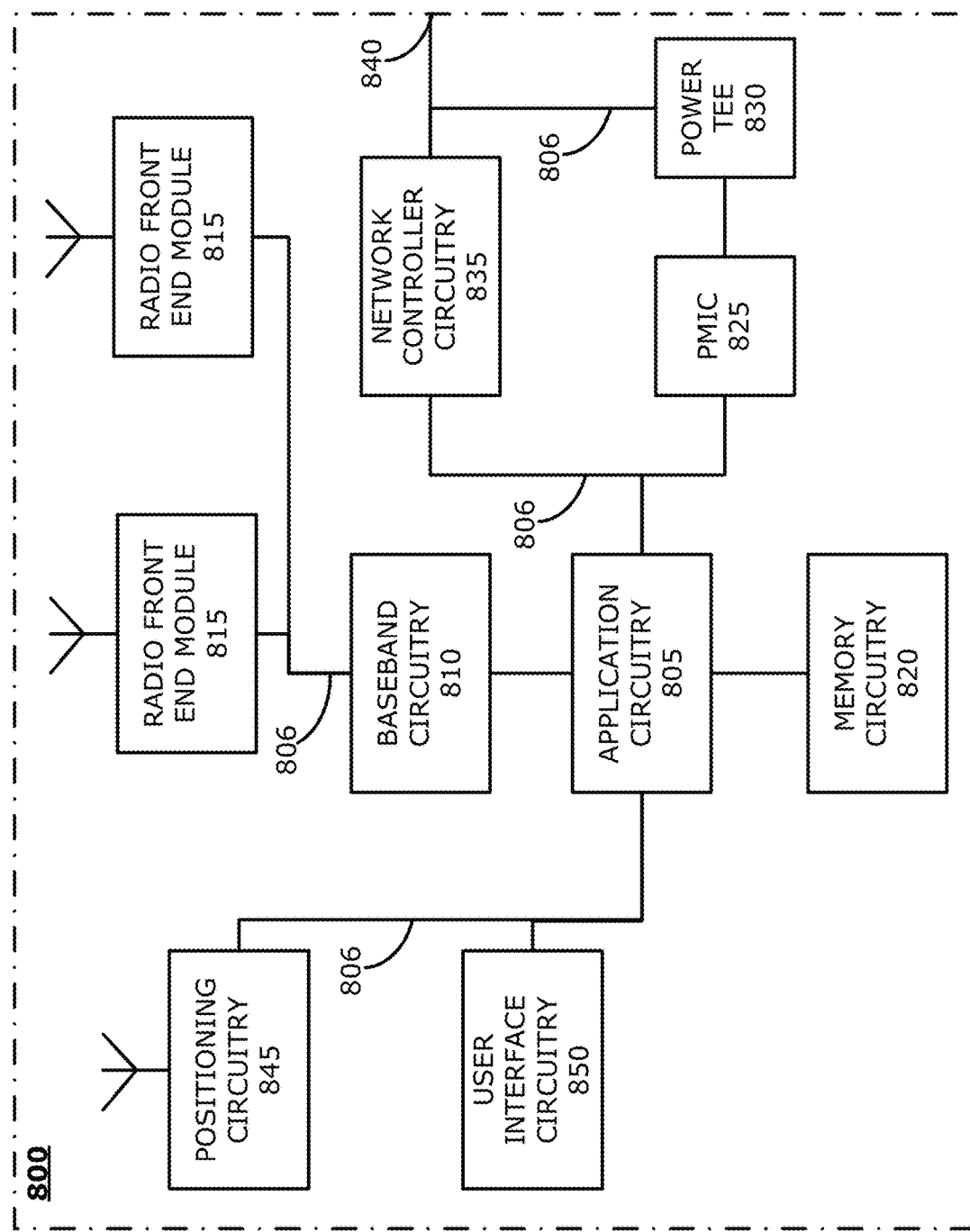
FIG. 8 illustrates an example of infrastructure equipment in accordance with various embodiments.

FIG. 8 illustrates an example of infrastructure equipment 800 in accordance with various embodiments. The infrastructure equipment 800 (or "system 800") may be implemented as a base station, radio head, RAN node such as the AN 508 shown and described previously, application server(s) 538, and/or any other element/device discussed herein. In other examples, the system 800 could be implemented in or by a UE 501.

The system 800 includes application circuitry 805, baseband circuitry 810, one or more radio front end modules (RFEMs) 815, memory circuitry 820, power management integrated circuitry (PMIC) 825, power tee circuitry 830, network controller circuitry 835, network interface connector 840, satellite positioning circuitry 845, and user interface 850. In some embodiments, the device 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 805 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry x05 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 805 may comprise, or may be, a special-purpose processor/controller to operate according to the various embodiments herein. As examples, the processor(s) of application circuitry 805 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 800 may not utilize application circuitry 805, and instead may include a special-purpose processor/controller to process IP data received from an EPC or 5GC, for example.

In some implementations, the application circuitry 805 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits.

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 5111 of FIG. 5 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 provides for electrical power to be drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocols. In some implementations, the network controller circuitry 835 may include multiple controllers to provide connectivity to other networks using the same or different protocols.

The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the baseband circuitry 810 and/or RFEMs 815 to communicate with the nodes and components of the positioning network. The positioning circuitry 845 may also provide position data and/or time data to the application circuitry 805, which may use the data to synchronize operations with various infrastructure (e.g., AN 508, etc.), or the like.

The components shown by FIG. 8 may communicate with one another using interface circuitry, which may include any number of bus and/or interconnect (IX) technologies such as ISA, extended ISA, I2C, SPI, point-to-point interfaces, power management bus (PMBus), PCI, PCIe, PCIx, Intel® UPI, Intel® IAL, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 9:
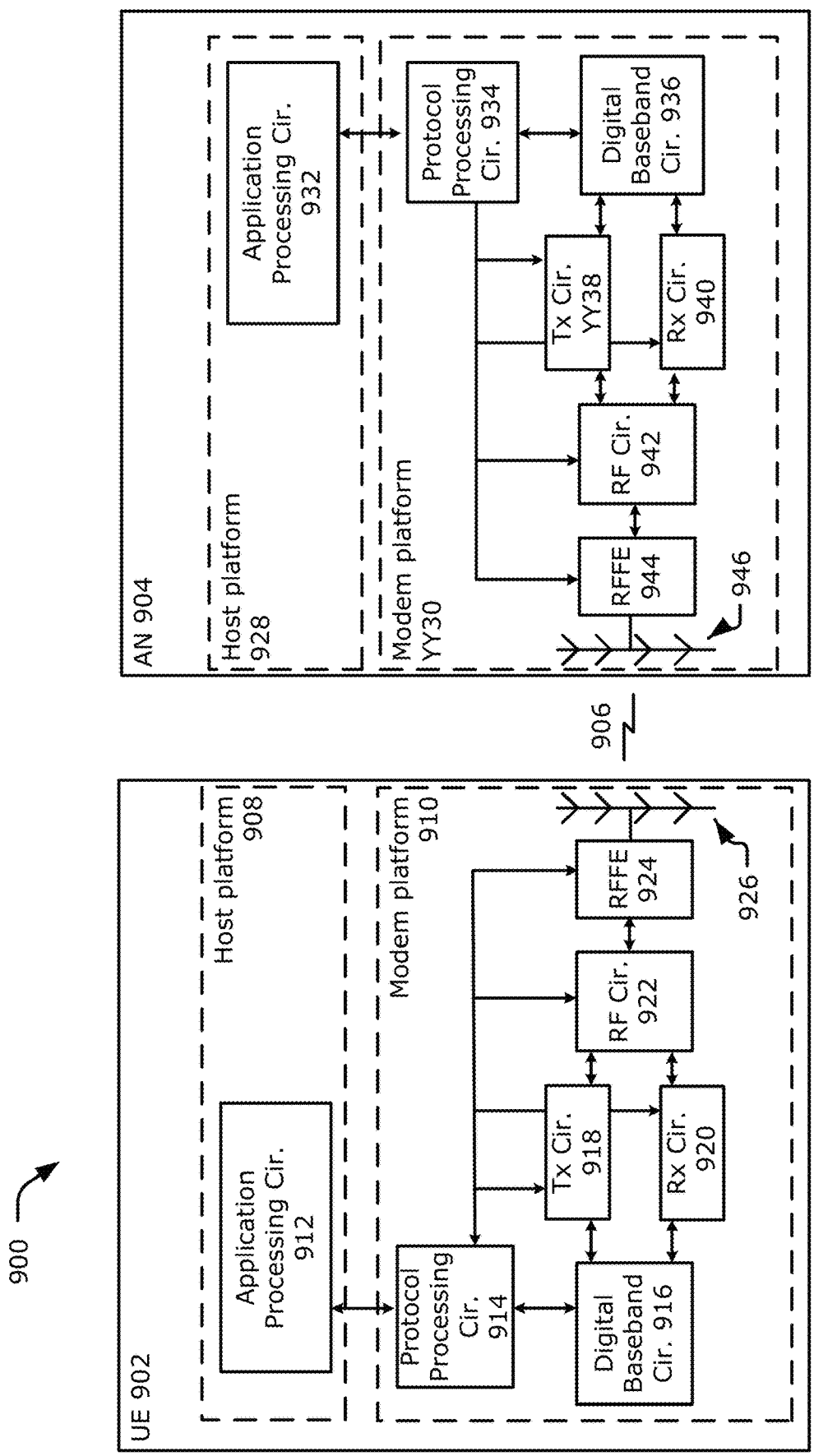
FIG. 9 schematically illustrates a wireless network in accordance with various embodiments.

FIG. 9 schematically illustrates a wireless network 900 in accordance with various embodiments. The wireless network 900 includes a UE 902 in wireless communication with an AN 904. The UE 902 and AN 94 may be the same, similar to, and/or substantially interchangeable with, like-named components described elsewhere herein such as the UE 601 and RAN 504 of FIG. 5, and/or system 800 of FIG. 4.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6 GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

Although not shown, the components of UE 902 and/or AN 904 may communicate with one another using a suitable bus or interconnect (IX) technology, which may include any number of technologies, including ISA, extended ISA, I2C, SPI, point-to-point interfaces, power management bus (PM-Bus), PCI, PCIe, PCIx, Intel® UPI, Intel® IAL, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX technology may be a proprietary bus, for example, used in an SoC based system.

Figure 10:
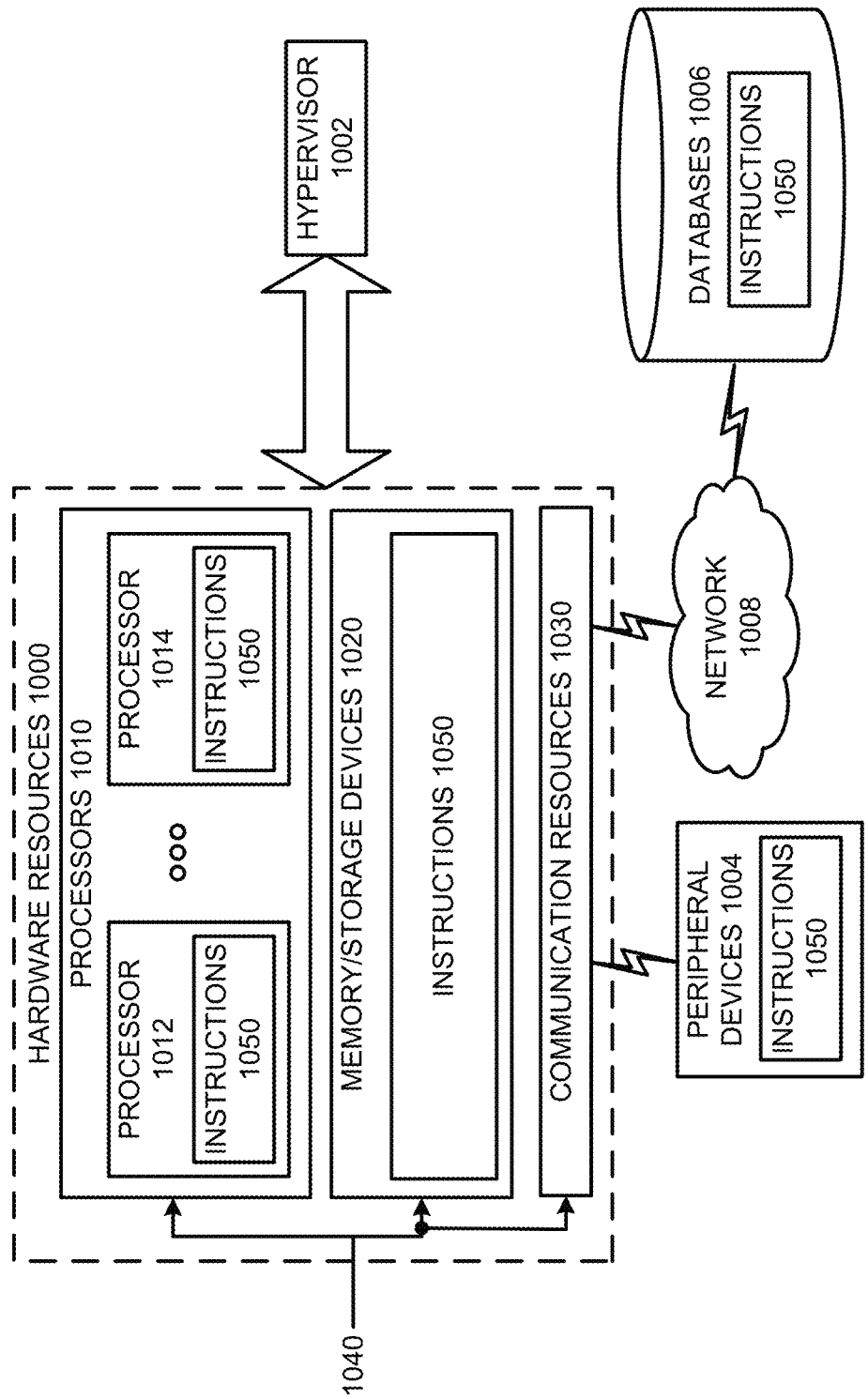
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 650 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 11:
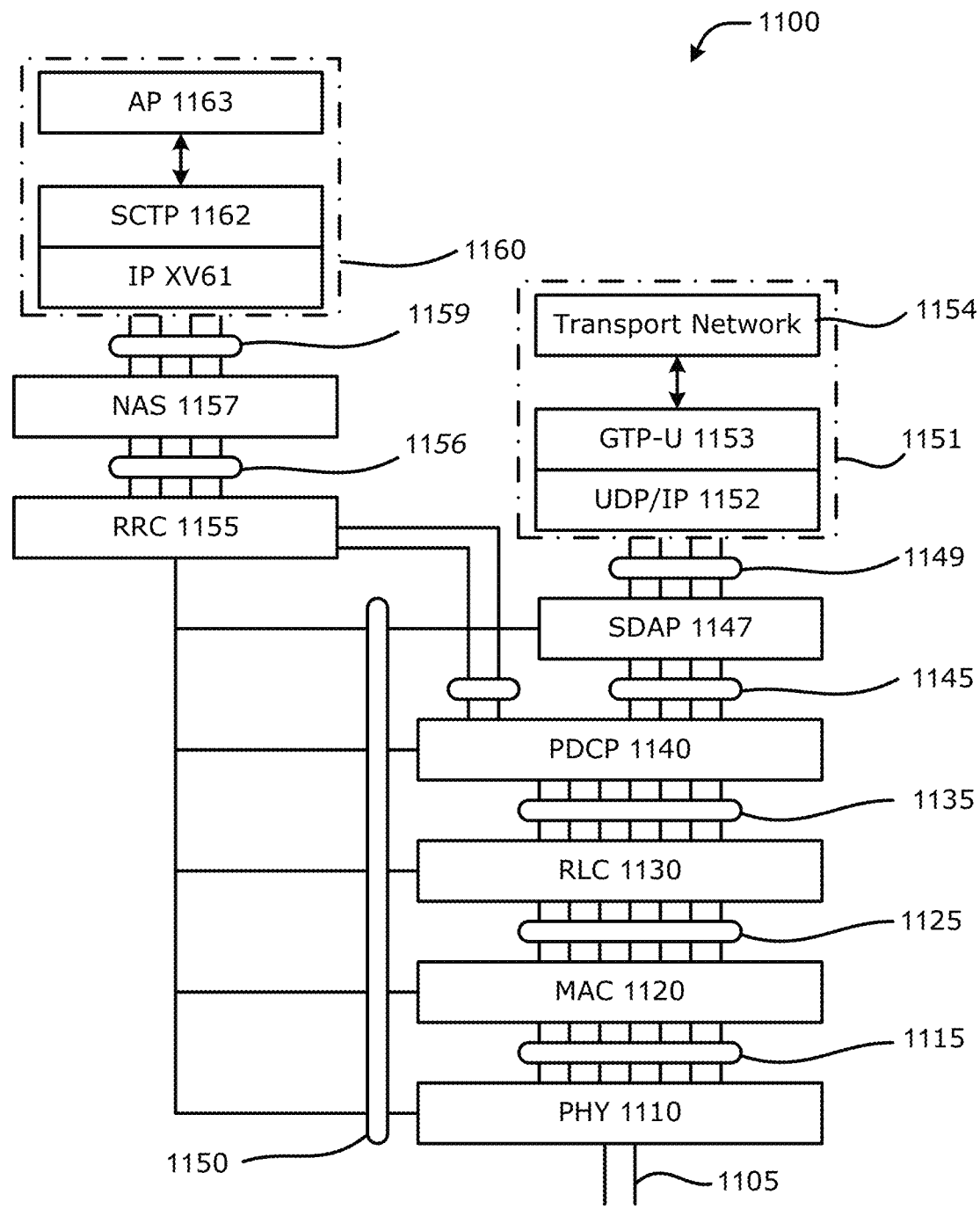
FIG. 11 illustrates various protocol functions that may be implemented in a wireless communication device according to various embodiments.

FIG. 11 illustrates various protocol functions that may be implemented in a wireless communication device according to various embodiments. In particular, FIG. 11 includes an arrangement 1100 showing interconnections between various protocol layers/entities. The following description of FIG. 11 is provided for various protocol layers/entities that operate in conjunction with the 5G/NR system standards and LTE system standards, but some or all of the aspects of FIG. 11 may be applicable to other wireless communication network systems as well.

The protocol layers of arrangement 1100 may include one or more of physical layer (PHY) 1110, media access control (MAC) 1120, radio link control (RLC) 1130, Packet Data Convergence Protocol (PDCP) 1140, Service Data Adaptation Protocol (SDAP) 1147, Radio Resource Control (RRC) 1155, and Non-Access Stratum (NAS) layer 1157, in addition to other higher layer functions not illustrated. The protocol layers may include one or more service access points (e.g., items 1159, 1156, 1150, 1149, 1145, 1135, 1125, and 1115 in FIG. 11) that may provide communication between two or more protocol layers.

The PHY 1110 may transmit and receive physical layer signals 1105 that may be received from or transmitted to one or more other communication devices. The physical layer signals 1105 may comprise one or more physical channels, such as those discussed herein. The PHY 1110 may further perform link adaptation or adaptive modulation and coding (AMC), power control, cell search (e.g., for initial synchronization and handover purposes), and other measurements used by higher layers, such as the RRC 1155. The PHY 1110 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1110 may process requests from and provide indications to an instance of MAC 1120 via one or more PHY-SAP 1115. According to some embodiments, requests and indications communicated via PHY-SAP 1115 may comprise one or more transport channels.

Instance(s) of MAC 1120 may process requests from, and provide indications to, an instance of RLC 1130 via one or more MAC-SAPs 1125. These requests and indications communicated via the MAC-SAP 1125 may comprise one or more logical channels. The MAC 1120 may perform mapping between the logical channels and transport channels, multiplexing of MAC SDUs from one or more logical channels onto TBs to be delivered to PHY 1110 via the transport channels, de-multiplexing MAC SDUs to one or more logical channels from TBs delivered from the PHY 1110 via transport channels, multiplexing MAC SDUs onto TBs, scheduling information reporting, error correction through HARQ, and logical channel prioritization.

Instance(s) of RLC 1130 may process requests from and provide indications to an instance of PDCP 1140 via one or more radio link control service access points (RLC-SAP)

1135. These requests and indications communicated via RLC-SAP 1135 may comprise one or more RLC channels. The RLC 1130 may operate in a plurality of modes of operation, including: Transparent Mode (TM), Unacknowledged Mode (UM), and Acknowledged Mode (AM). The RLC 1130 may execute transfer of upper layer protocol data units (PDUs), error correction through automatic repeat request (ARQ) for AM data transfers, and concatenation, segmentation and reassembly of RLC SDUs for UM and AM data transfers. The RLC 1130 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1140 may process requests from and provide indications to instance(s) of RRC 1155 and/or instance(s) of SDAP 1147 via one or more packet data convergence protocol service access points (PDCP-SAP) 1145. These requests and indications communicated via PDCP-SAP 1145 may comprise one or more radio bearers. The PDCP 1140 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1147 may process requests from and provide indications to one or more higher layer protocol entities via one or more SDAP-SAP 1149. These requests and indications communicated via SDAP-SAP 1149 may comprise one or more QoS flows. The SDAP 1147 may map QoS flows to DRBs, and vice versa, and may also mark QFIs in DL and UL packets. A single SDAP entity 1147 may be configured for an individual PDU session. In the UL direction, the NG-RAN 514 may control the mapping of QoS Flows to DRB(s) in two different ways, reflective mapping or explicit mapping. For reflective mapping, the SDAP 1147 of a UE 502 may monitor the QFIs of the DL packets for each DRB, and may apply the same mapping for packets flowing in the UL direction. For a DRB, the SDAP 1147 of the UE 502 may map the UL packets belonging to the QoS flows(s) corresponding to the QoS flow ID(s) and PDU session observed in the DL packets for that DRB. To enable reflective mapping, the NG-RAN 514 may mark DL packets over the Uu interface with a QoS flow ID. The explicit mapping may involve the RRC 1155 configuring the SDAP 1147 with an explicit QoS flow to DRB mapping rule, which may be stored and followed by the SDAP 1147. In embodiments, the SDAP 1147 may only be used in NR implementations and may not be used in LTE implementations.

The RRC 1155 may configure, via one or more management service access points (M-SAP), aspects of one or more protocol layers, which may include one or more instances of PHY 1110, MAC 1120, RLC 1130, PDCP 1140 and SDAP 1147. In embodiments, an instance of RRC 1155 may process requests from and provide indications to one or more NAS entities 1157 via one or more RRC-SAPs 1156. The main services and functions of the RRC 1155 may include broadcast of system information (e.g., included in MIBs or SIBs related to the NAS), broadcast of system information related to the access stratum (AS), paging, establishment, maintenance and release of an RRC connection between the UE 502 and RAN 504 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1157 may form the highest stratum of the control plane between the UE 502 and the AMF 621. The NAS 1157 may support the mobility of the UEs 502 and the session management procedures to establish and maintain IP connectivity between the UE 502 and a P-GW in LTE systems.

One or more protocol entities of arrangement 1100 may be implemented in UEs 502, RAN nodes 508, AMF 621 in NR implementations or MME in LTE implementations, UPF 602 in NR implementations or S-GW and P-GW in LTE implementations, or the like to be used for control plane or user plane communications protocol stack between the aforementioned devices. In such embodiments, one or more protocol entities that may be implemented in one or more of UE 502, gNB 516, AMF 621, etc. may communicate with a respective peer protocol entity that may be implemented in or on another device using the services of respective lower layer protocol entities to perform such communication. In some embodiments, a gNB-CU of the gNB 516 may host the RRC 1155, SDAP 1147, and PDCP 1140 of the gNB that controls the operation of one or more gNB-DUs, and the gNB-DUs of the gNB 516 may each host the RLC 1130, MAC 1120, and PHY 1110 of the gNB 516.

In a first example, a control plane protocol stack may comprise, in order from highest layer to lowest layer, NAS 1157, RRC 1155, PDCP 1140, RLC 1130, MAC 1120, and PHY 1110. In this example, upper layers 1160 may be built on top of the NAS 1157, which includes an IP layer 1161, an SCTP 1162, and an application layer signaling protocol (AP) 1163.

In NR implementations, the AP 1163 may be an NG application protocol layer (NGAP or NG-AP) 1163 for the NG interface defined between the NG-RAN node 516, 518 and the AMF 621, or the AP 1163 may be an Xn application protocol layer (XnAP or Xn-AP) 1163 for the Xn interface that is defined between two or more RAN nodes 508.

The NG-AP 1163 may support the functions of the NG interface and may comprise Elementary Procedures (EPs). An NG-AP EP may be a unit of interaction between the NG-RAN 514 and the AMF 621. The NG-AP 1163 services may comprise two groups: UE-associated services (e.g., services related to a UE 502) and non-UE-associated services (e.g., services related to the whole NG interface instance between the NG-RAN 514 and AMF 621). These services may include functions including, but not limited to: a paging function for the sending of paging requests to NG-RAN 514 involved in a particular paging area; a UE context management function for allowing the AMF 621 to establish, modify, and/or release a UE context in the AMF 621 and the NG-RAN 514; a mobility function for UEs 502 in ECM-CONNECTED mode for intra-system HOs to support mobility within NG-RAN 514 and inter-system HOs to support mobility from/to EPS systems; a NAS Signaling Transport function for transporting or rerouting NAS messages between UE 502 and AMF 621; a NAS node selection function for determining an association between the AMF 621 and the UE 502; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 508 via CN 600; and/or other like functions.

The XnAP 1163 may support the functions of the Xn interface and may comprise XnAP basic mobility procedures and XnAP global procedures. The XnAP basic mobility procedures may comprise procedures used to handle UE mobility within the NG RAN 508 (or E-UTRAN XR110), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 502, such as Xn interface setup and reset procedures, NG-RAN update procedures, cell activation procedures, and the like.

In LTE implementations, the AP 1163 may be an S1 Application Protocol layer (S1-AP) 1163 for the S1 interface defined between an E-UTRAN node 508 and an MME, or the AP 1163 may be an X2 application protocol layer (X2AP or X2-AP) 1163 for the X2 interface that is defined between two or more E-UTRAN nodes 508.

The S1 Application Protocol layer (S1-AP) 1163 may support the functions of the S1 interface, and similar to the NG-AP discussed previously, the S1-AP may comprise S1-AP EPs. An S1-AP EP may be a unit of interaction between the E-UTRAN node 508 and an MME XR121 within an LTE CN 522. The S1-AP 1163 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1163 may support the functions of the X2 interface and may comprise X2AP basic mobility procedures and X2AP global procedures. The X2AP basic mobility procedures may comprise procedures used to handle UE mobility within the E-UTRAN 510, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 502, such as X2 interface setup and reset procedures, load indication procedures, error indication procedures, cell activation procedures, and the like.

The SCTP layer (alternatively referred to as the SCTP/IP layer) 1162 may provide guaranteed delivery of application layer messages (e.g., NGAP or XnAP messages in NR implementations, or S1-AP or X2AP messages in LTE implementations). The SCTP 1162 may ensure reliable delivery of signaling messages between the RAN node 508 and the AMF 621/MME based, in part, on the IP protocol, supported by the IP 1161. The Internet Protocol layer (IP) 1161 may be used to perform packet addressing and routing functionality. In some implementations the IP layer 1161 may use point-to-point transmission to deliver and convey PDUs. In this regard, the RAN node 508 may comprise L2 and L1 layer communication links (e.g., wired or wireless) with the MME/AMF to exchange information.

In a second example, a user plane protocol stack may comprise, in order from highest layer to lowest layer, SDAP 1147, PDCP 1140, RLC 1130, MAC 1120, and PHY 1110. The user plane protocol stack may be used for communication between the UE 502, the RAN node 508, and UPF 602 in NR implementations or an S-GW and P-GW in LTE implementations. In this example, upper layers 1151 may be built on top of the SDAP 1147, and may include a user datagram protocol (UDP) and IP security layer (UDP/IP) 1152, a General Packet Radio Service (GPRS) Tunneling Protocol for the user plane layer (GTP-U) 1153, and a User Plane PDU layer (UP PDU) 1163.

The transport network layer 1154 (also referred to as a "transport layer") may be built on IP transport, and the GTP-U 1153 may be used on top of the UDP/IP layer 1152 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1153 may be used for carrying user data within the GPRS core network and between the radio access network and the core network. The user data transported can be packets in any of IPv4, IPv6, or PPP formats, for example. The UDP/IP 1152 may provide checksums for data integrity, port numbers for addressing different functions at the source and destination, and encryption and authentication on the selected data flows. The RAN node 508 and the S-GW XR122 may utilize an S1-U interface to exchange user plane data via a protocol stack comprising an L1 layer (e.g., PHY 1110), an L2 layer (e.g., MAC 1120, RLC 1130, PDCP 1140, and/or SDAP 1147), the UDP/IP layer 1152, and the GTP-U 1153. The S-GW XR122 and the P-GW XR123 may utilize an S5/S8a interface to exchange user plane data via a protocol stack comprising an L1 layer, an L2 layer, the UDP/IP layer 1152, and the GTP-U 1153. As discussed previously, NAS protocols may support the mobility of the UE 502 and the session management procedures to establish and maintain IP connectivity between the UE 502 and the P-GW XR123.

Moreover, although not shown by FIG. 11, an application layer may be present above the AP 1163 and/or the transport network layer 1154. The application layer may be a layer in which a user of the UE 502, RAN node 508, or other network element interacts with software applications being executed, for example, by application circuitry XS105 or application circuitry XS205, respectively. The application layer may also provide one or more interfaces for software applications to interact with communications systems of the UE 502 or RAN node 508, such as the baseband circuitry XT110. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

4. Example Implementations

Figure 12:
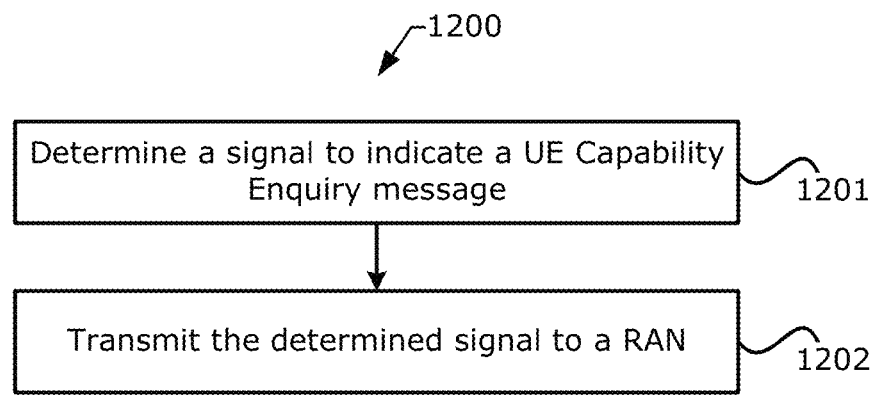
FIGS. 12, 13, and 14 illustrate example procedures for practicing various embodiments discussed herein.
Figure 13:
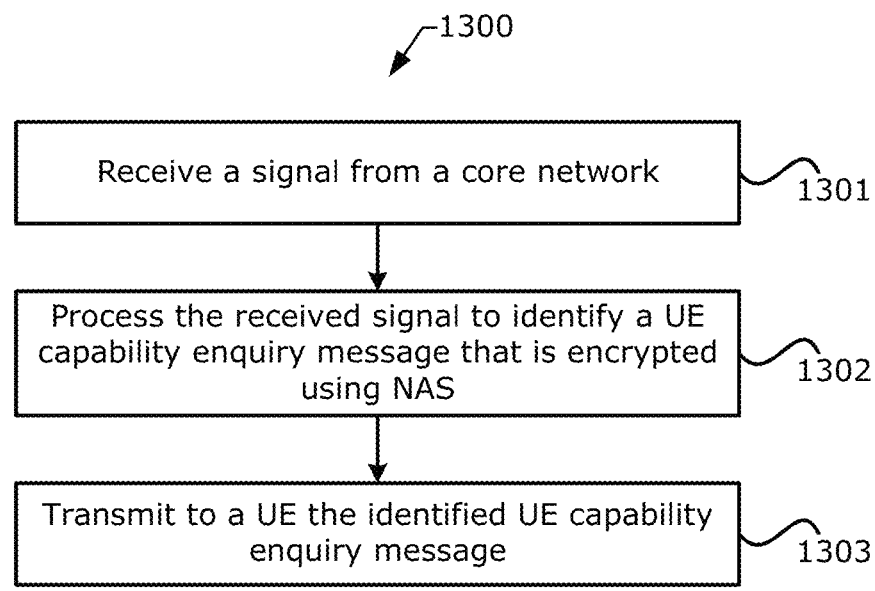
Figure 14:
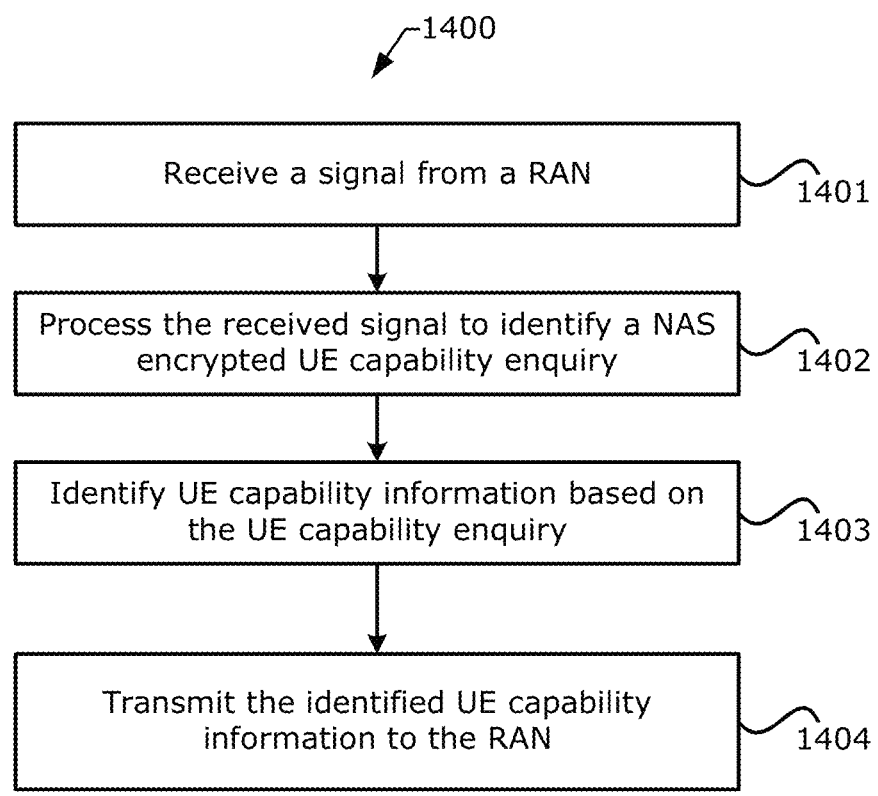

FIGS. 12, 13, and 14 illustrate processes 1200, 1300, and 1400, respectively for practicing various embodiments herein. While particular examples and orders of operations are illustrated FIGS. 12, 13, and 14, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 1200 may be performed by NW 120. Process 1200 begins at operation 1201 where the NW 120 determines and generates a signal to indicate a UE Capability Enquiry message, wherein the message is encrypted and integrity protected using NAS keys. At operation 1202, the NW 120 transmits the determined signal is to RAN 504.

Process 13 may be performed by RAN 504. Process 13 begins at operation 1301 where the RAN 504 receives a signal is received from the NW 120. At operation 1302, the RAN 504 processes the received signal to identify a UE capability enquiry message that is encrypted using NAS. At operation 1303, the RAN 504 transmits the identified UE capability enquiry message to a UE 502.

Process 14 may be performed by a UE 502. Process 14 begins at operation 1401 where the UE 502 receives a signal from a RAN 504. At operation 1402, the UE 502 processes the received signal to identify a NAS encrypted UE capability enquiry. At operation 1403, the UE 502 identifies the UE capability information based on the UE capability enquiry. At operation 1404, the UE 502 transmits the identified UE capability information to the RAN 504.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 includes a method of operating a network function (NF), the method comprising: determining a downlink Message Authentication Code (DL_MAC) using a user equipment (UE) capability enquiry as an input to a Non-Access Stratum (NAS) integrity algorithm and a NAS integrity key ($K_{NASint}$) as a key for the NAS integrity algorithm; and sending the determined DL_MAC to a Radio Access Network (RAN) for delivery to a UE.

Example 2 includes the method of example 1 and/or some other examples herein, further comprising: obtaining a NAS UE capability indication message from the RAN.

Example 3 includes the method of examples 1-2 and/or some other examples herein, further comprising: encrypting the UE Capability Enquiry message using currently used NAS encryption algorithm and a NAS encryption key ($K_{NASenc}$) as a key for the NAS encryption algorithm, wherein the encrypted UE Capability Enquiry message is sent to the RAN with the DL_MAC.

Example 4 includes the method of examples 1-3 and/or some other examples herein, further comprising: determining a counter value, wherein the determined counter value is sent to the RAN with the DL_MAC.

Example 5 includes the method of examples 1-4 and/or some other examples herein, wherein the UE does not have Access Stratum (AS) security mechanisms enabled.

Example 6 includes the method of examples 1-5 and/or some other examples herein, further comprising: obtaining, from the RAN, an uplink Message Authentication Code (UL_MAC) generated by the UE; and sending a message including a UE capability information element (IE) to the RAN upon successful verification of the UL_MAC.

Example 7 includes the method of example 6 and/or some other examples herein, wherein another counter and an encrypted UE Capability IE is obtained with the UL_MAC, wherein the UE Capability IE is encrypted using the $K_{NASenc}$.

Example 8 includes the method of examples 1-7 and/or some other examples herein, further comprising: decrypting the encrypted UE Capability IE using the $K_{NASenc}$; and generating the message to include the decrypted UE Capability IE.

Example 9 includes the method of examples 1-8 and/or some other examples herein, further comprising: obtaining a Radio Resource Control (RRC) message including a NAS Protocol Data Unit (PDU) generated by the UE, the NAS PDU including an encrypted version of a UE Capability Information message; and sending a message including a decrypted version of the UE Capability Information message to the RAN.

Example 10 includes the method of examples 1-9 and/or some other examples herein, wherein the NF is an Access and Mobility Management Function (AMF), an Authentication Server Function (AUSF), an Authentication credential Repository and Processing Function (ARPF), a Subscription Identifier De-concealing Function (SIDF), or a Security Anchor Function (SEAF).

Example 11 includes a method of operating a user equipment (UE), the method comprising: receiving a user equipment (UE) capability enquiry message from a Radio Access Network (RAN); determining an uplink Message Authentication Code (UL_MAC) using the UE capability enquiry message as an input to a Non-Access Stratum (NAS) integrity algorithm and a NAS integrity key ($K_{NASint}$) as a key for the NAS integrity algorithm; and sending the determined UL_MAC to a Radio Access Network (RAN) for delivery to a network function (NF).

Example 12 includes the method of example 11 and/or some other examples herein, further comprising: verifying the UE capability enquiry message using the $K_{NASint}$; and decrypting the UE capability enquiry message using a NAS encryption key ($K_{NASenc}$) when the UE capability enquiry message includes an encrypted payload.

Example 13 includes the method of example 11 and/or some other examples herein, wherein a downlink Message Authentication Code (DL_MAC) and a counter value is obtained with the UE capability enquiry message.

Example 14 includes the method of example 13 and/or some other examples herein, further comprising: determining the UL_MAC using the DL_MAC and the counter value obtained with the UE capability message.

Example 15 includes the method of example 14 and/or some other examples herein, wherein, determining the UL_MAC comprises: operating a key derivation function (KDF) using the $K_{NASint}$, the counter, and one of UE capability information, a UE capability identifier (ID), or a hash of the UE capability information.

Example 16 includes the method of examples 11-15 and/or some other examples herein, wherein the UE does not have Access Stratum (AS) security mechanisms enabled.

Example 17 includes the method of examples 11-16 and/or some other examples herein, further comprising: sending a UE capability information message with the UL_MAC.

Example 18 includes the method of example 17 and/or some other examples herein, further comprising: encrypting a UE capability information element (IE) using the $K_{NASenc}$, wherein the $K_{NASenc}$ is a key outside of a Packet Data Convergence Protocol (PDCP) layer implemented by the UE; and sending the encrypted UE capability IE with the UL_MAC.

Example 19 includes the method of example 18 and/or some other examples herein, further comprising: implementing a NAS layer entity to generate a NAS Protocol Data Unit (PDU) to include the encrypted version of a UE Capability IE; impelementing a Radio Resource Control (RRC) layer entity to generate an RRC message to include the NAS PDU; and sending the RRC message to the RAN for delivery to the NF.

Example 20 includes the method of example 19 and/or some other examples herein, further comprising: receiving another NAS PDU from the NF, the other NAS PDU including a Radio Network Temporary Identifier (RNTI) assigned to the UE; obtaining the RNTI from the other NAS PDU; and generating the NAS PDU to include the obtained RNTI. Example Z01 may include an apparatus comprising means to perform one or more elements of a method described in or related to any of examples 1-20, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example Z03 may include an apparatus comprising logic, modules, or circuitry to perform one or more elements of a method described in or related to any of examples 1-20, or any other method or process described herein.

Example Z04 may include a method, technique, or process as described in or related to any of examples 1-20, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example Z06 may include a signal as described in or related to any of examples 1-20, or portions or parts thereof.

Example Z07 may include a datagram, packet, frame, segment, protocol data unit (PDU), or message as described in or related to any of examples 1-20, or portions or parts thereof, or otherwise described in the present disclosure.

Example Z08 may include a signal encoded with data as described in or related to any of examples 1-20, or portions or parts thereof, or otherwise described in the present disclosure.

Example Z09 may include a signal encoded with a datagram, packet, frame, segment, protocol data unit (PDU), or message as described in or related to any of examples 1-20, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example Z11 may include a computer program comprising instructions, wherein execution of the program by a processing element is to cause the processing element to carry out the method, techniques, or process as described in or related to any of examples 1-20, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

5. Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "SMTC" refers to an SSB-based measurement timing configuration configured by SSB-MeasurementTimingConfiguration. The term "SSB" refers to an SS/PBCH block. The term "a Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with carrier aggregation (CA). The term "Special Cell" refers to the PCell of the MCG or the PSCell of the SCG for DC operation; otherwise, the term "Special Cell" refers to the Pcell.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-GSB, ITS-GSC, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

A "network slice" refers to a logical network that provides specific network capabilities and network characteristics, supporting various service properties for network slice customers. A "Network Slice instance" or "NSI" represents service view of a network slice which exposes the root NetworkSliceSubnet instance. A "network slice subnet" is a representation of a set of network functions and the associated resources (e.g., compute, storage and networking resources) supporting network. A Network Slice Subnet instance" or "NSSI" refers to a Managed Object Instance (MOI) of Network Slice Subnet Information Object Class (IOC). A "Service Level Specification" or "SLS" refers to a set of service level requirements associated with a Service Level Agreement (SLA) to be satisfied by a network slice.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. An apparatus to be employed as a network function (NF), the apparatus comprising:
processor circuitry configurable to: determine a downlink Message Authentication Code (DL_MAC) using a user equipment (UE) capability enquiry as an input to a Non-Access Stratum (NAS) integrity algorithm and a NAS integrity key ($K_{NASint}$) as a key for the NAS integrity algorithm; and
network interface circuitry (NIC) communicatively coupled with the processor circuitry, the NIC configurable to send the determined DL_MAC to a Radio Access Network (RAN) for delivery to a UE.

2. The apparatus of claim 1, wherein the NIC is further configurable to:
obtain a NAS UE capability indication message from the RAN.

3. The apparatus of claim 1, wherein the processor circuitry is further configurable to:
encrypt the UE capability enquiry using currently used NAS encryption algorithm and a NAS encryption key ($K_{NASenc}$) as a key for the NAS encryption algorithm, wherein the encrypted UE capability enquiry is sent to the RAN with the DL_MAC.

4. The apparatus of claim 1, wherein the processor circuitry is further configurable to:
determine a counter value, wherein the determined counter value is sent to the RAN with the DL_MAC.

5. The apparatus of claim 1, wherein the UE does not have Access Stratum (AS) security mechanisms enabled.

6. The apparatus of claim 1, wherein the NIC is further configurable to:
obtain, from the RAN, an uplink Message Authentication Code (UL_MAC) generated by the UE; and
send a message including a UE capability information element (IE) to the RAN upon successful verification of the UL_MAC.

7. The apparatus of claim 6, wherein another counter and an encrypted UE capability IE is obtained with the UL_MAC, wherein the UE capability IE is encrypted using a $K_{NASenc}$.

8. The apparatus of claim 7, wherein the processor circuitry is further configurable to:
decrypt the encrypted UE capability IE using the $K_{NASenc}$; and
generate the UE capability enquiry to include the decrypted UE capability IE.

9. The apparatus of claim 1, wherein the NIC is further configurable to:
obtain a Radio Resource Control (RRC) message including a NAS Protocol Data Unit (PDU) generated by the UE, the NAS PDU including an encrypted version of a UE capability information message; and
send a message including a decrypted version of the UE capability information message to the RAN.

10. The apparatus of claim 1, wherein the NF is an Access and Mobility Management Function (AMF), an Authentication Server Function (AUSF), an Authentication credential Repository and Processing Function (ARPF), a Subscription Identifier De-concealing Function (SIDF), or a Security Anchor Function (SEAF).

11. One or more non-transitory computer readable media (NTCRM) comprising instructions, wherein execution of the instructions by one or more processors of a user equipment (UE) is to cause the UE to:
receive a user equipment (UE) capability enquiry message from a Radio Access Network (RAN);
determine an uplink Message Authentication Code (UL_MAC) using the UE capability enquiry message as an input to a Non-Access Stratum (NAS) integrity algorithm and a NAS integrity key ($K_{NASint}$) as a key for the NAS integrity algorithm; and
send the determined UL_MAC to the RAN for delivery to a network function (NF).

12. The one or more NTCRM of claim 11, wherein execution of the instructions is to cause the UE to:
verify the UE capability enquiry message using the $K_{NASint}$; and
decrypt the UE capability enquiry message using a NAS encryption key ($K_{NASenc}$) when the UE capability enquiry message includes an encrypted payload.

13. The one or more NTCRM of claim 11, wherein a downlink Message Authentication Code (DL_MAC) and a counter value is obtained with the UE capability enquiry message.

14. The one or more NTCRM of claim 13, wherein execution of the instructions is to cause the UE to:
determine the UL_MAC using the DL_MAC and the counter value obtained with the UE capability enquiry message.

15. The one or more NTCRM of claim 14, wherein, to determine the UL_MAC, execution of the instructions is to cause the UE to:
operate a key derivation function (KDF) using the $K_{NASint}$, the counter value, and one of UE capability information, a UE capability identifier (ID), or a hash of the UE capability information.

16. The one or more NTCRM of claim 11, wherein the UE does not have Access Stratum (AS) security mechanisms enabled.

17. The one or more NTCRM of claim 11, wherein execution of the instructions is to cause the UE to:
send a UE capability information message with the UL_MAC.

18. The one or more NTCRM of claim 17, wherein execution of the instructions is to cause the UE to:
encrypt a UE capability information element (IE) using a $K_{NASenc}$, wherein the $K_{NASenc}$ is a key outside of a Packet Data Convergence Protocol (PDCP) layer implemented by the UE; and
send the encrypted UE capability IE with the UL_MAC.

19. The one or more NTCRM of claim 18, wherein execution of the instructions is to cause the UE to:
implement a NAS layer entity to generate a NAS Protocol Data Unit (PDU) to include the encrypted UE capability IE;
implement a Radio Resource Control (RRC) layer entity to generate an RRC message to include the NAS PDU; and
send the RRC message to the RAN for delivery to the NF.

20. The one or more NTCRM of claim 19, wherein execution of the instructions is to cause the UE to:
receive another NAS PDU from the NF, wherein the other NAS PDU includes a Radio Network Temporary Identifier (RNTI) assigned to the UE;
obtain the RNTI from the other NAS PDU; and
generate the NAS PDU to include the obtained RNTI.

* * * * *